(12) United States Patent
Kawamura et al.

(10) Patent No.: US 11,099,553 B2
(45) Date of Patent: Aug. 24, 2021

(54) OPERATION PLAN CREATION DEVICE, OPERATION PLAN CREATION SYSTEM, OPERATION PLAN CREATION METHOD, AND PROGRAM

(71) Applicant: MITSUBISHI HITACHI POWER SYSTEMS, LTD., Yokohama (JP)

(72) Inventors: Naoya Kawamura, Tokyo (JP); Manabu Kasano, Tokyo (JP); Tomoaki Kitagawa, Tokyo (JP); Hiroyuki Isu, Tokyo (JP); Naoyuki Fujiwara, Tokyo (JP); Shun Kawachi, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 15 days.

(21) Appl. No.: 16/493,622

(22) PCT Filed: Mar. 12, 2018

(86) PCT No.: PCT/JP2018/009517
§ 371 (c)(1),
(2) Date: Sep. 12, 2019

(87) PCT Pub. No.: WO2018/168773
PCT Pub. Date: Sep. 20, 2018

(65) Prior Publication Data
US 2020/0081428 A1 Mar. 12, 2020

(30) Foreign Application Priority Data

Mar. 17, 2017 (JP) .............................. JP2017-053028

(51) Int. Cl.
G05B 23/02 (2006.01)
G06Q 10/00 (2012.01)
G07C 5/08 (2006.01)

(52) U.S. Cl.
CPC ......... *G05B 23/0283* (2013.01); *G06Q 10/20* (2013.01); *G07C 5/0816* (2013.01)

(58) Field of Classification Search
CPC ... G05B 23/0283; G06Q 10/20; G07C 5/0816
(Continued)

(56) References Cited

U.S. PATENT DOCUMENTS

2003/0187530 A1* 10/2003 Hotta ................. G06Q 10/0631
700/97
2004/0162811 A1 8/2004 Wetzer et al.
(Continued)

FOREIGN PATENT DOCUMENTS

JP 2002-245093 A 8/2002
JP 2004-005461 A 1/2004
(Continued)

OTHER PUBLICATIONS

PCT/ISA/210, "International Search Report for International Application No. PCT/JP2018/009517," dated May 29, 2018.
(Continued)

*Primary Examiner* — Ricky Go
(74) *Attorney, Agent, or Firm* — Kanesaka Berner and Partners LLP

(57) ABSTRACT

An operation plan creation device that is configured to create an operation plan for a plurality of parts to be mounted in a device includes a setting data acquisition unit configured to acquire setting data including information on a time of start of an operation of the part and a time of a scheduled performance of inspection of the part, and information on parts that are candidates for assignment to the device, for each device, an operation plan creation unit configured to create data of the operation plan including an operation period of the part from the time of the start of the operation to the time of the scheduled performance of inspection using
(Continued)

the setting data, and an assignability determination unit configured to determine an assignability for the part.

12 Claims, 20 Drawing Sheets

(58) Field of Classification Search
USPC .......................................................... 702/184
See application file for complete search history.

(56) References Cited

U.S. PATENT DOCUMENTS

| 2005/0143956 A1* | 6/2005 | Long .................. F04D 15/0088 |
| | | 702/184 |
| 2011/0178895 A1 | 7/2011 | Kodama et al. |
| 2012/0035975 A1 | 2/2012 | Sugimoto et al. |
| 2015/0378338 A1 | 12/2015 | Kawamura et al. |
| 2017/0016400 A1 | 1/2017 | Kitagawa et al. |

FOREIGN PATENT DOCUMENTS

| JP | 2005-240776 A | 9/2005 |
| JP | 2010-217982 A | 9/2010 |
| JP | 2014-170376 A | 9/2014 |
| JP | 2015-121855 A | 7/2015 |

OTHER PUBLICATIONS

PCT/ISA/237, "Written Opinion of the International Searching Authority for International Application No. PCT/JP2018/009517," dated May 29, 2018.

* cited by examiner

| STANDARD PART | COMPATIBLE PART | FLAG |
|---|---|---|
| AAAA | AAAA-1 | 1 |
| AAAA | BBBB | 1 |
| AAAA | CCCC | 1 |
| AAAA | GGGG | 0 |

~185

FIG. 4
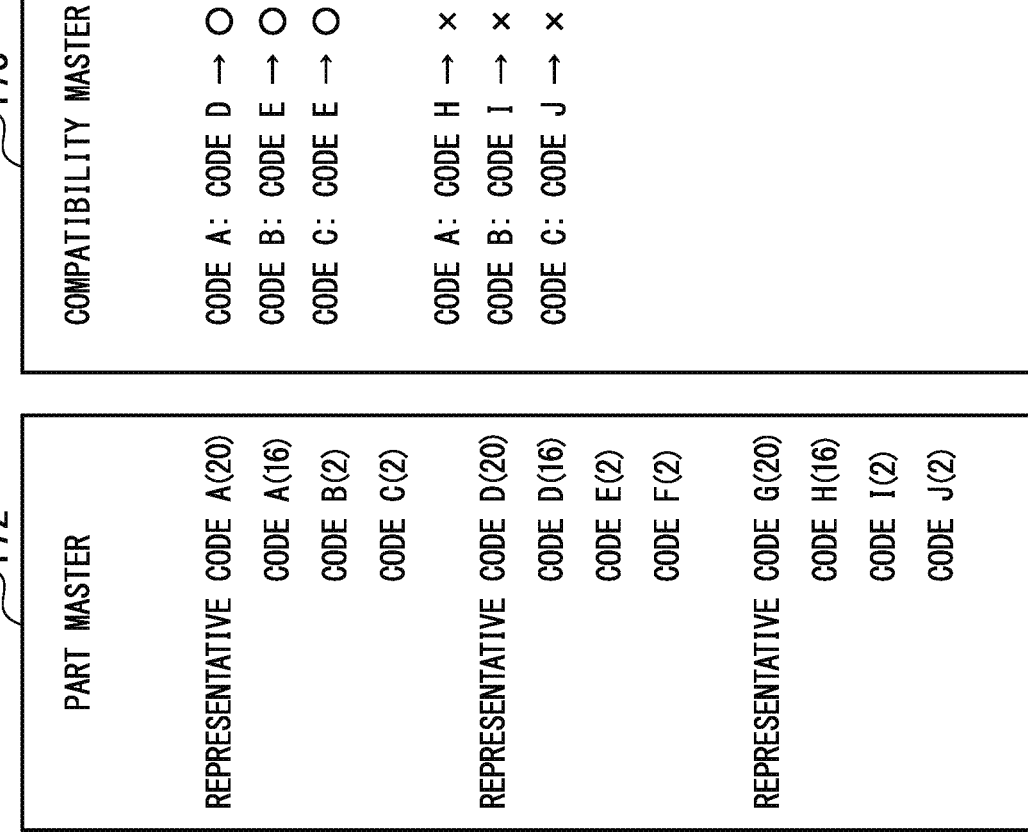
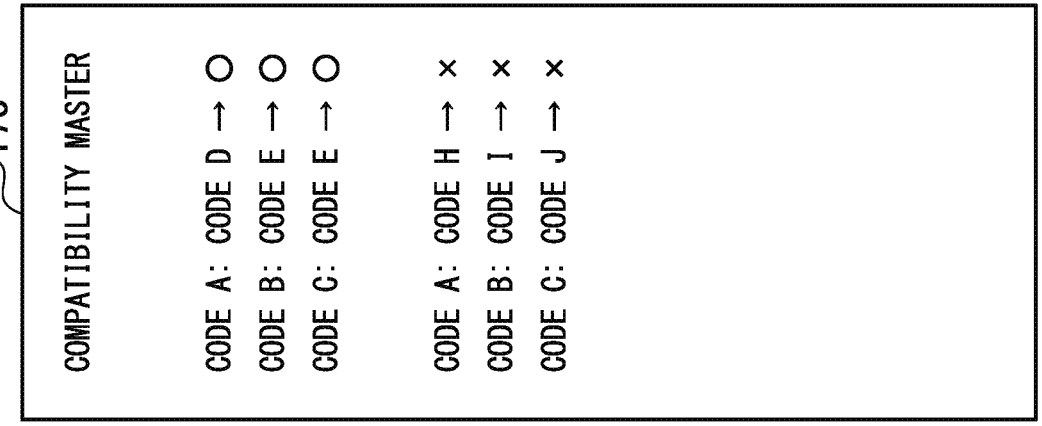
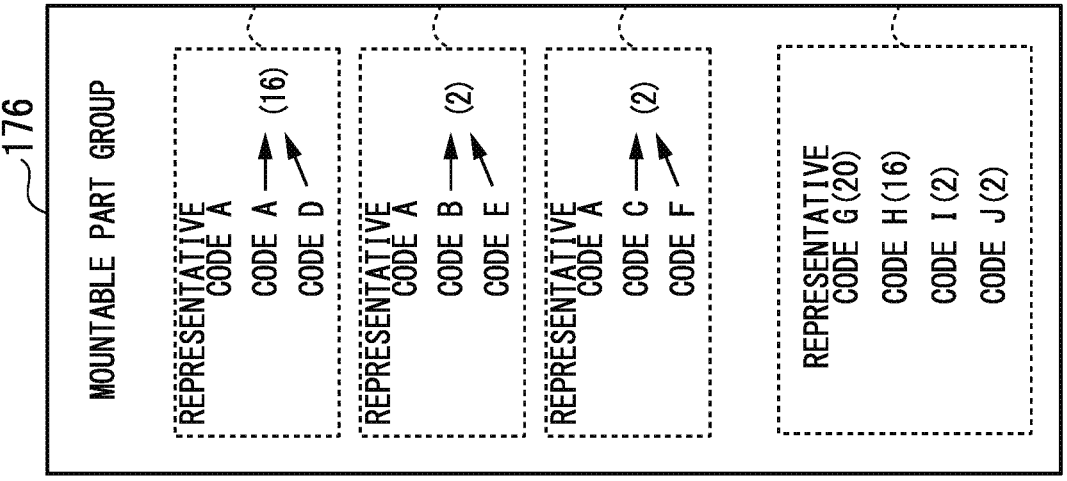

FIG. 5

| SHEET NAME | ITEM | INDISPENS-ABLE | INPUT FORMAT | INPUT EXAMPLE | DESCRIPTION |
|---|---|---|---|---|---|
| config | NUMBER OF DEVICES | O | PULL DOWN | 4 | NUMBER OF UNITS OF DEVICE IN PLANT |
| | PLANNED NUMBER OF YEARS | O | INPUT | 13 | NUMBER OF YEARS IN WHICH PART ROTATION IS DESIRED TO BE CALCULATED |
| | PLANT NAME | O | INPUT | PL1 | PLANT NAME |
| | MODEL | O | INPUT | | MODEL |
| | DELIVERED PARTS | O | INPUT | REPRESENTATIVE CODE A | PARTS FOR WHICH PART ROTATION IS CONSIDERED. DESCRIBED IN HORIZONTAL DIRECTION. |
| | COMBUSTION PATTERN | | INPUT | GAS ONLY | COMBUSTION PATTERN IS DESCRIBED. NOT AFFECT ROTATION CALCULATION. |
| | YEAR OF OPERATION START | O | INPUT | 2010 | YEAR OF OPERATION START (YEAR OF START IS DESCRIBED WHEN PART ROTATION IS DRAWN FROM MIDWAY, NOT FROM START OF OPERATION) |
| | MONTH OF OPERATION START | O | INPUT | 10 | MONTH OF OPERATION START (MONTH OF START IS DESCRIBED WHEN PART ROTATION IS DRAWN FROM MIDWAY, NOT FROM START OF OPERATION) |
| | REGULAR INSPECTION INTERVAL | O | INPUT | 18000 | INTERVAL TIME BETWEEN REGULAR INSPECTIONS. FOR EACH DEVICE. WITH START DATE IN CASE OF REVISION. |
| | PART LIFE | O | INPUT | | PARTS LIFE TIME. FOR EACH DEVICE. WITH START DATE IN CASE OF REVISION. |
| | REPLACEMENT PATTERN | O | INPUT | 1 | NUMBER OF INTERVALS TO BE REPLACED IS SET. 1 = REPLACE WITH 1 INTERVAL, 2 = REPLACE WITH 2 INTERVALS |
| Parts_Master | DELIVERED PART NAME | O | INPUT | REPRESENTATIVE CODE A | PARTS FOR WHICH PART ROTATION IS CONSIDERED. |
| | DELIVERY PART ID | O | INPUT | REPRESENTATIVE CODE A | SAME AS ABOVE. (BECAUSE IT IS NECESSARY FOR CALCULATION) |
| | CONSTITUENT PART | O | INPUT | CODE A | WHEN ONE PART IS CONFIGURED OF PLURALITY OF PARTS, CONSTITUENT PART ARE DESCRIBED BY ONLY THAT NUMBER. |
| | NUMBER OF CONSTITUENT PARTS | O | INPUT | 16 | NUMBER OF CONSTITUENT PARTS |

FIG. 6

| | A | B | C | D | E | F | G | H |
|---|---|---|---|---|---|---|---|---|
| 1 | MENU | | | | | | | |
| 2 | | | | | | | | |
| 3 | | | | | P/R TABLE CREATION | | | |
| 4 | | | | | | | | |
| 5 | | | | | | | | |
| 6 | | | | | | | | |
| 7 | | | | | | | | |
| 8 | | | | | | | | |
| 9 | SETTING OF BASIC INFORMATION OF PLANT | | | | | | | |
| 10 | NUMBER OF PARTS | 4 | | | | | | |
| 11 | NUMBER OF PLANNED YEARS | 13 | | | | | | |
| 12 | PLANT NAME | PL | | | | | | |
| 13 | FORMAT | *** | | | | | | |
| 14 | DELIVERED PART | *** | | | | | | |
| 15 | | COM | TP | M.N | P.N | TS1 | TS2 | TS3 |
| 16 | | | | | | | | |

| INPUT AND CORRECTION FORM | | | | | |
|---|---|---|---|---|---|
| INPUT (UPDATE) PART NAME, MOUNTING TIME, NUMBER OF PARTS, PROCESSING CATEGORY | | | | | |
| PART NAME | NUMBER OF PARTS | PROCESSING CLASSIFICATION | MOUNTING TIME | DEVICE | REMARKS |
| ☑ CODE A | 16 | C(CONTINUOUS USE) | 8000 | FIRST DEVICE | |
| ☑ CODE B | 2 | C(CONTINUOUS USE) | 8000 | FIRST DEVICE | |
| ☑ CODE C | 2 | C(CONTINUOUS USE) | 8000 | FIRST DEVICE | |
| | | | | | |
| | | | | | |
| | | | | | |

ELAPSED TIME: 7900

PERIOD: 2010 YEAR 10 MONTH ~ 2011 YEAR 10 MONTH

ADD    UPDATE

FIG. 11

| PART TOTAL | | | | 2010 | | | | | | | | | | | | 2011 | | | | | | | | | | | |
|---|---|---|---|---|---|---|---|---|---|---|---|---|---|---|---|---|---|---|---|---|---|---|---|---|---|---|---|
| DELIVERED PART | DEVICE | CLASSIFICATION | | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| CODE A | SITE TOTAL | N (NEW) | | 0 | 0 | 0 | 0 | 0 | 0 | 0 | 0 | 0 | 16 | 16 | 16 | 0 | 0 | 0 | 0 | 0 | 0 | 0 | 0 | 0 | 0 | 0 | 1 |
| | SITE TOTAL | R (REPAIR) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | S (DISPOSAL DUE TO END OF LIFE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | S (DISPOSAL DUE TO NON-REPAIRABLE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (NEW) ARRANGED | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (REPAIR) ARRANGED | | 0 | 0 | 0 | 0 | 0 | 0 | 0 | 0 | 0 | 2 | 2 | 2 | 0 | 0 | 0 | 0 | 0 | 0 | 0 | 0 | 0 | 0 | 0 | 0 |
| CODE B | SITE TOTAL | N (NEW) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | R (REPAIR) | | 0 | 0 | 0 | 0 | 0 | 0 | 0 | 0 | 0 | 2 | 2 | 2 | 0 | 0 | 0 | 0 | 0 | 0 | 0 | 0 | 0 | 0 | 0 | 0 |
| | SITE TOTAL | S (DISPOSAL DUE TO END OF LIFE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | S (DISPOSAL DUE TO NON-REPAIRABLE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (NEW) ARRANGED | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (REPAIR) ARRANGED | | 0 | 0 | 0 | 0 | 0 | 0 | 0 | 0 | 0 | 2 | 2 | 2 | 0 | 0 | 0 | 0 | 0 | 0 | 0 | 0 | 0 | 0 | 0 | 0 |
| CODE C | SITE TOTAL | N (NEW) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | R (REPAIR) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | S (DISPOSAL DUE TO END OF LIFE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | SITE TOTAL | S (DISPOSAL DUE TO NON-REPAIRABLE) | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (NEW) ARRANGED | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | REMARKS | N (REPAIR) ARRANGED | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

PLANT NAME:PL1, operation1

PART DETAILS    PART CODE DESIGNATION [    ]

| ... | PART CODE | SERIAL No. | SERIAL No. | NUMBER OF START AND STOP TIMES | NUMBER OF PARTS |
|---|---|---|---|---|---|
| ... | AAAA | — | 4000 [−] | 12 | 16 |
| ... |  | 7FA00001 | 4000 | 12 | 1 |
| ... |  | 7FA00008 | 4000 | 12 | 1 |
| ... | ... | ... | ... | ... | ... |
| ... | BBBB | — | 2000 [+] | ... | ... |

[ADD NEW PART] [SEARCH] [CANCEL] [DECIDE]

300

PLANT NAME:PL1, operation2

PART DETAILS    PART CODE DESIGNATION [    ]

| ... | PART CODE | SERIAL No. | SERIAL No. | NUMBER OF START AND STOP TIMES | NUMBER OF PARTS |
|---|---|---|---|---|---|
| ... | AAAA | — | 5000 [−] | 15 | 2 |
| ... |  | 7FA00002 | 5000 | 15 | 1 |
| ... |  | 7FA00004 | 5000 | 15 | 1 |
| ... | ... | ... | ... | ... | ... |
| ... | BBBB | — | 3000 [+] | ... | ... |

[ADD NEW PART] [SEARCH] [CANCEL] [DECIDE]

FIG. 14

310 — ASSIGNABLE PARTS

| PART CODE DESIGNATION | AAAA ▼ | | | |
|---|---|---|---|---|

| ... | PART CODE | SERIAL No. | OPERATION TIME | NUMBER OF START AND STOP TIMES |
|---|---|---|---|---|
| ... | AAAA | 7FA00033 | 1000 | 5 |
| ... | AAAA | 7FA00101 | 0 | 0 |
| ... | AAAA | 7FA00102 | 0 | 0 |
| ... | AAAA | 7FA00103 | 0 | 0 |
| ... | ... | ... | ... | ... |

[ADD NEW PART] [CANCEL] [DECIDE]

FIG. 15

320 — ADD NEW PART

| ... | PART CODE | SERIAL NO. | OPERATION TIME | NUMBER OF START AND STOP TIMES | NUMBER OF PARTS |
|---|---|---|---|---|---|
| ... | AAAA ▼ | 7FA00104 | 0 | 0 | 1 |
| ... | AAAA ▼ | 7FA00105 | 0 | 0 | 1 |
| ... | ... | ... | ... | ... | ... |

[ADD ROW] [CANCEL]

| unit | SERIAL No. | unit2 | job2 | operation time | unit3 | job3 |
|---|---|---|---|---|---|---|
| 1 | 7FA00008 | 1 | operation1 | 4000 | 1 | operation2 |
| 1 | 7FA00004 | 1 | operation2 | 5000 | 1 | operation1 |
|  | 7FA00104 |  |  | 0 | 1 | operation2 |
| 1 | 7FA00002 | 1 | operation2 | 5000 |  |  |

FIG. 19

RESERVE PART SETTING SCREEN — 400

PLANT NAME : PL1

| SERIAL No. | ... | PART CODE | DESIGN LIFE | OPERATION TIME | CURRENT JOB | RESERVE FLAG | OPEN JOB |
|---|---|---|---|---|---|---|---|
| 7FA0001 | ... | AAAA | × | 4000 | operation1 | ☐ | |
| 7FA0006 | ... | AAAA | × | 1000 | | ☐ | |
| 7FA0008 | ... | AAAA | × | 4000 | operation10 | ☑ | operation3 |
| 7FA00100 | ... | AAAA | × | 3000 | operation1 | ☐ | |
| 7FB00100 | ... | BBBB | × | 2000 | operation1 | ☐ | |
| 7FC00022 | ... | CCCC | × | 2000 | operation1 | ☐ | |
| ... | ... | ... | ... | ... | ... | ... | ... |

STORE

DETAILED SETTING — 401

SERIAL No.
7FA0008

☑ RESERVE FLAG

JOB FOR OPENING RESERVE
operation2

END

OPERATION PLAN CREATION DEVICE, OPERATION PLAN CREATION SYSTEM, OPERATION PLAN CREATION METHOD, AND PROGRAM

TECHNICAL FIELD

The present invention relates to an operation plan creation device, an operation plan creation system, an operation plan creation method, and a program.

Priority is claimed on Japanese Patent Application No. 2017-53028, filed Mar. 17, 2017, the content of Which is incorporated herein by reference.

BACKGROUND ART

For example, a gas turbine is operated using so-called management in which high-temperature parts such as moving blades are replaced with spare parts or repaired parts and used. The high-temperature parts are expensive and indispensable parts, and creation of a management plan that enables a low-cost operation is important for a user operating the gas turbine. For example, Patent Document 1 describes an operation plan creation device capable of efficiently creating and updating a management plan.

CITATION LIST

Patent Literature

[Patent Document 1] Japanese Unexamined Patent Application, First Publication No. 2014-170376

SUMMARY OF INVENTION

Technical Problem

However, when there is an incompatible combination of parts and, for example, a management plan is created only in terms of costs, there is a likelihood of creation of a management plan with which an actual operation in which parts that cannot be simultaneously used are mounted is impossible. In the method described in Patent Document 1, this point is not taken into consideration.

An object of the present invention is to provide an operation plan creation device, an operation plan creation system, an operation plan creation method, and a program capable of solving the above-described problems.

Solution to Problem

According to a first aspect of the present invention, an operation plan creation device is an operation plan creation device that is configured to create an operation plan for a plurality of parts to be mounted in a device, the operation plan creation device including: a setting data acquisition unit configured to acquire selling data including information on a time of start of an operation of the part and a time of a scheduled performance of inspection of the part, and information on parts that are candidates for assignment to the device, for each device; an operation plan creation unit configured to create data of the operation plan including an operation period of a part from the time of the start of the operation to the time of the scheduled performance of inspection using the setting data; and an assignability determination unit configured to determine an assignability for the part, wherein the operation plan creation unit is configured to create the data of the operation plan when the plurality of parts determined to be assignable by the assignability determination unit have been used.

With this configuration, it is possible to create operation plan data of parts with a configuration which only parts that can be assigned to the device have been used.

According to a second aspect of the present invention, the operation plan creation device further includes an operation plan updating unit configured to update the data of the operation plan created by the operation plan creation unit on the basis of information on an operation record of the part, wherein the operation plan updating unit updates the data of the operation plan with data of an operation plan when a first part is replaced with a second part determined to be assignable by the assignability determination unit among the parts that are assignment candidates.

With this configuration, when replacement of parts is necessary: in an operation plan of parts, it is possible to create operation plan data of the parts with a configuration in which part replacement using assignable parts has been performed.

According to a third aspect of the present invention, in the operation plan creation device, the assignability determination unit determines whether or not there is compatibility between the first part and the second part.

With this configuration, it is possible to create an operation plan in which compatible parts are exchanged with each other.

According to the fourth aspect of the present invention, in the operation plan creation device, the assignability determination unit determines whether or not the parts that are assignment candidates are able to be simultaneously mounted and used in the device.

With this configuration, it is possible to create an operation plan in a case in which only parts that can be simultaneously mounted and used have been mounted.

According to a fifth aspect of the present invention, in the operation plan creation device, the assignability determination unit determines an assignability for the parts on the basis of mountable part group information based on information defining whether or not a plurality of types of parts can be simultaneously mounted and used in the device, and information defining compatibility among the plurality of types of parts.

According to a sixth aspect of the present invention, the operation plan creation device further includes a master registration unit configured to register information defining compatibility among the plurality of types of parts.

With the configuration described in the fifth and sixth aspects, the assignability determination unit can determine whether or not a part can be assigned to the device.

According to a seventh aspect of the present invention, the operation plan creation device further includes an input reception unit configured to receive a change of a third part planned to be mounted included in the data of the operation plan to a fourth part, wherein the operation plan updating unit is configured to create the data of the operation plan after a change in which the third part has been changed to the fourth part.

With this configuration, it is possible to change parts planned to be mounted in the device in the operation plan data.

According to an eighth aspect of the present invention, the input reception unit receives designation of a fifth part to be excluded from candidates of assignment to the device among the parts, the operation plan creation is configured to create the data of the operation plan with the parts other than the fifth part being assignment targets, and the operation plan updating unit updates the data of the operation plan with the parts other than the fifth part being assignment targets.

With this configuration, it is possible to designate parts to be excluded from targets of assignment to the device.

According to a ninth aspect of the present invention, an operation plan creation device is an operation plan creation device that is configured to create an operation plan for a plurality of parts to be mounted in a device, the operation plan creation device including: a setting data acquisition unit configured to acquire setting data including information on a time of start of an operation of the part and a time of a scheduled performance of inspection of the part, and information on parts that are candidates for assignment to the device, for each device; an operation plan creation unit configured to create data of the operation plan including an operation period of the part from the time of the start of the operation to the time of the scheduled performance of inspection using the setting data; and an operation plan updating unit configured to update the data of the operation plan created by the operation plan creation unit; and an input reception unit configured to receive a change of one part planned to be mounted included in the data of the operation plan to another part, wherein the operation plan updating unit is configured to create the data of the operation plan after the change in which the one part has been changed to the other part when the input reception unit has received the change of the one part to the other part.

With this configuration, it is possible to create operation plan data indicating a management plan for parts to be assigned to the device, and to change a part planned to be assigned in the operation plan data.

According to a tenth aspect of the present invention, an operation plan creation system includes the operation plan creation device; a first device configured to acquire information on an operation record of the device from the device and transmit the information to the operation plan creation device; and a second device configured to acquire information defining compatibility of the parts and transmit the information to the operation plan creation device.

With this configuration, it is possible to acquire accurate information from the operation record of the device that affects the operation plan of the part. Further, it is possible to acquire information defining an assignability for the parts, which is necessary for creation of operation plan data for the parts with high accuracy, through the second device manipulated by a person who holds the information.

An eleventh aspect of the present invention is an operation plan creation method including: a step of acquiring, by an operation plan creation device that is configured to create an operation plan for a plurality of parts to be mounted in a device, setting data including information on a time of start of an operation of the part and a time of a scheduled performance of inspection of the part, and information on parts that are candidates for assignment to the device, for each device; a step of creating, by the operation plan creation device, data of the operation plan including an operation period of the part from the time of the start of the operation to the time of the scheduled performance of inspection using the setting data; and a step of determining, by the operation plan creation device, an assignability for the part, wherein the step of creating the data of the operation plan includes creating the data of the operation plan when the plurality of parts determined to be assignable in the step of determining the assignability have been used.

A twelfth aspect of the present invention is a program causing a computer including an operation plan creation device that is configured to create an operation plan for a plurality of parts to be mounted in a device to function as: a means configured to acquire setting data including information on a time of start of an operation of the part and a time of a scheduled performance of inspection of the part, and information on parts that are candidates for assignment to the device, for each device; a means configured to create data of the operation plan including an operation period of the part from the time of the start of the operation to the time of the scheduled performance of inspection using the setting data; and a means configured to determine an assignability for the part, wherein the means configured to create the data of the operation plan is configured to create the data of the operation plan when the plurality of parts determined to be assignable by the means configured to determine the assignability have been used.

Advantageous Effects of Invention

With the operation plan creation device, the operation plan creation system, the operation plan creation method, and the program described above, it is possible to automatically create a management plan in consideration of compatibility of parts. Further, it is possible to replace parts planned to be mounted in the created management plan.

BRIEF DESCRIPTION OF DRAWINGS

FIG. 4 is a diagram showing mountable part group information in the first embodiment according to the present invention.

FIG. 5 is a first diagram showing the process of the operation plan creation device in the first embodiment according to the present invention.

FIG. 6 is a second diagram showing the process of the operation plan creation device in the first embodiment according to the present invention.

FIG. 9 is a fifth diagram showing the process of the operation plan creation device in the first embodiment according to the present invention.

FIG. 11 is a diagram showing an example of a screen in which the number of parts is displayed in the first embodiment according to the present invention.

FIG. 13 is a first diagram showing an operation plan correction process according to a second embodiment of the present invention.

FIG. 14 is a second diagram showing the process of correcting the operation plan according to the second embodiment of the present invention.

FIG. 15 is a third diagram showing the process of correcting the operation plan according to the second embodiment of the present invention.

FIG. 19 is a first diagram showing a part reserve process in the second embodiment according to the present invention.

DESCRIPTION OF EMBODIMENTS

First Embodiment

Hereinafter, an operation plan creation device according to a first embodiment of the present invention will be described with reference to FIGS. 1 to 12.

Figure 1:
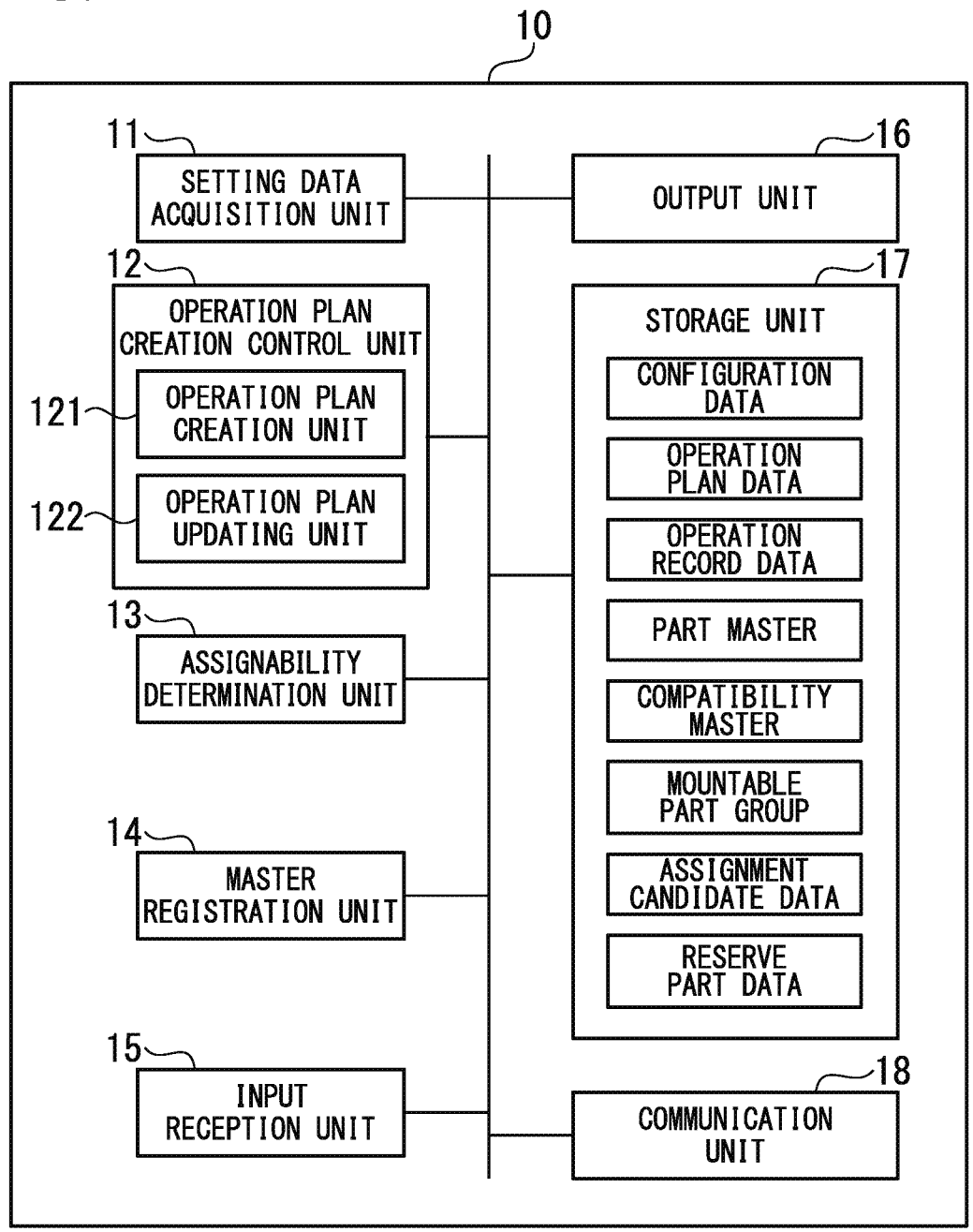
FIG. 1 is a block diagram showing an example of an operation plan creation device in a first embodiment and a second embodiment according to the present invention.

FIG. 1 is a block diagram showing an example of an operation plan creation device in the first embodiment and a second embodiment according to the invention.

The operation plan creation device of the first embodiment creates data of an operation plan of parts that are mounted in a device that is operated in a plant or facility, and reflects the created operation plan in an actual operation record to update the actual operation record. The parts are, for example, high-temperature parts such as moving blades, stationary blades, split rings, combustors, and tail cylinders of gas turbines, impellers or sealing devices of compressors, and the like. The operation plan is a plan of replacement of used parts with spare parts, repaired parts, or new parts, and is a so-called management plan. This management may be performed between the used parts and spare parts or repaired parts prepared in the same device, or may also be performed between the used parts and spare parts or repaired parts prepared in different devices of the same type. Alternatively, the management may include a case in which a new product is purchased for replacement. The operation plan creation device is configured using, for example, a computer such as one or a plurality of server terminal devices.

As shown in FIG. 1, the operation plan creation device 10 includes a setting data acquisition unit 11, an operation plan creation control unit 12, an operation plan creation unit 121, an operation plan updating unit assignability determination unit 13, a master registration unit 14, an input reception unit 15, an output unit 16, a storage unit 17, and a communication unit 18.

The setting data acquisition unit 11 acquires, for each device in which a part for which an operation plan is created has been mounted, setting data including information on a time at which operation of a part starts and a time at which part inspection is scheduled to be performed, and information on a part that is a candidate for assignment to the device.

The operation plan creation control unit 12 performs control of a process of creating or updating data regarding the operation plan (operation plan data).

The operation plan creation unit 121 creates operation plan data including an operation period of the parts from the time at which the operation starts to the time at which inspection is scheduled to be performed, using the setting data.

The operation plan updating unit 122 updates the data of the operation plan created by the operation plan creation unit 121 on the basis of information on the operation record of the parts.

The assignability determination unit 13 determines the assignability for parts that are assignment candidates on the basis of compatibility between parts or whether a plurality of parts are a part group that can be simultaneously mounted and used in the device. More specifically, the assignability determination unit 13 determines the assignability for parts on the basis of mountable part group information based on information defining compatibility among a plurality of types of parts (a compatibility master) or information defining a group of parts that can be used simultaneously (a part master). Here, the assignability indicates that there is compatibility between a part before replacement and a part after replacement (the part before replacement and the part after replacement can be used interchangeably), and candidate parts can be simultaneously mounted and used in a device. The operation plan creation unit 121 creates operation plan data using a plurality of parts to be mounted in the device, which have been determined to be assignable (to be mountable and usable simultaneously) by the assignability determination unit 13, when operation plan data is created. The operation plan updating unit 122 updates the data of the operation plan using the part (a first part) before replacement with data of the operation plan at the time of replacement with a second part determined to be compatible by the assignability determination unit 13 among the parts that are assignment candidates.

The master registration unit 14 registers, in the compatibility master, information defining the compatibility between a plurality of types of parts.

The master registration unit 14 and the compatibility master will be described next with reference to FIGS. 2A and 2B.

The input reception unit 15 receives an input of instruction information or the like to the operation plan creation device 10 by the user.

The output unit 16 performs, for example, output of the operation plan data to a display connected to the operation plan creation device 10.

The storage unit 17 stores various of pieces of data and programs necessary for creation and updating of operation plan data. For example, the storage unit 17 stores setting data, operation plan data, operation record data, a part master, a compatibility master, a mountable part group, assignment candidate data, reserve part data, and the like.

The communication unit 18 communicates other devices. For example, the communication unit 18 receives information detected by a sensor included in a device such as a plant.

Figure 2A:
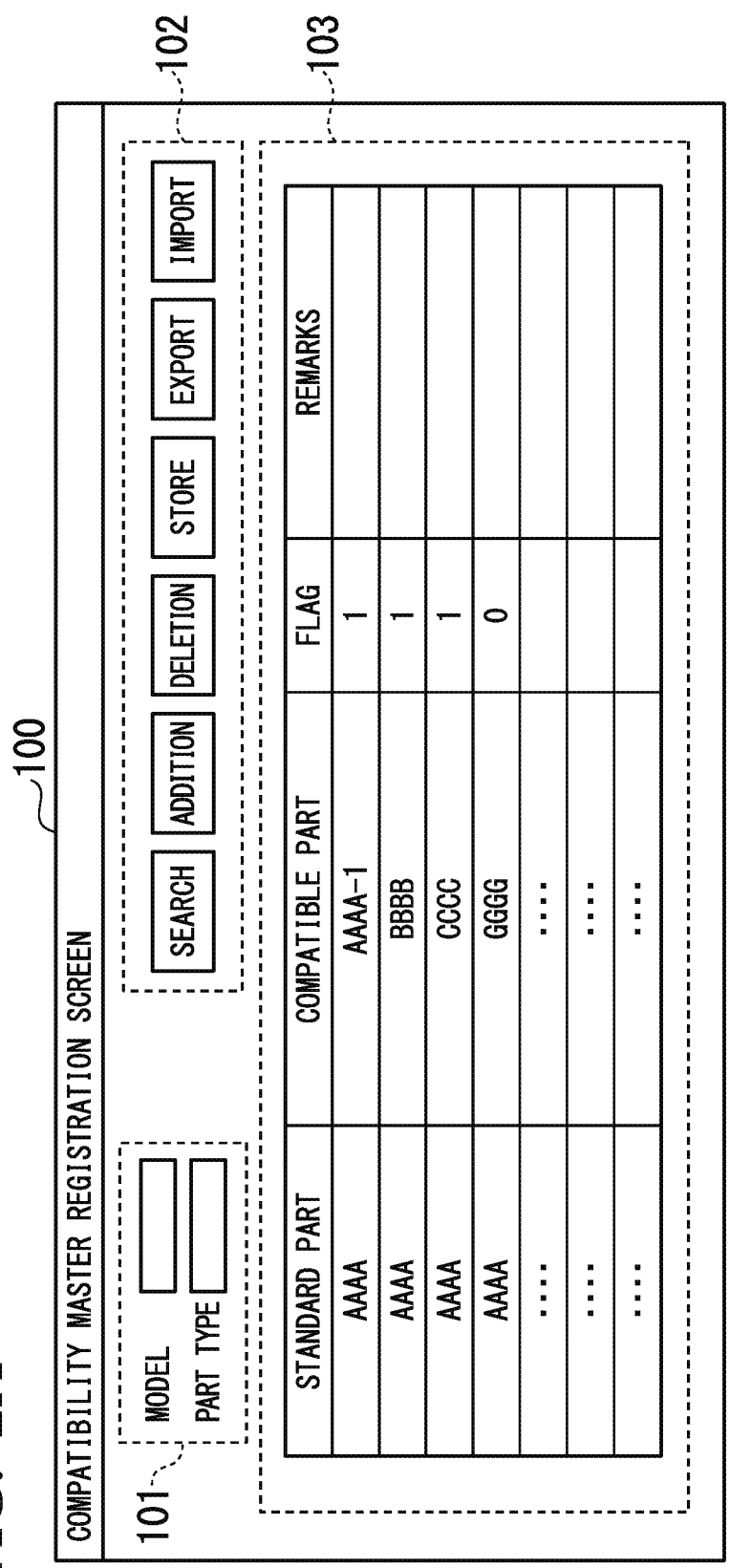
FIG. 2A is a first diagram showing a process of registering information defining compatibility in the first embodiment according to the present invention.
Figures 2B, 3:
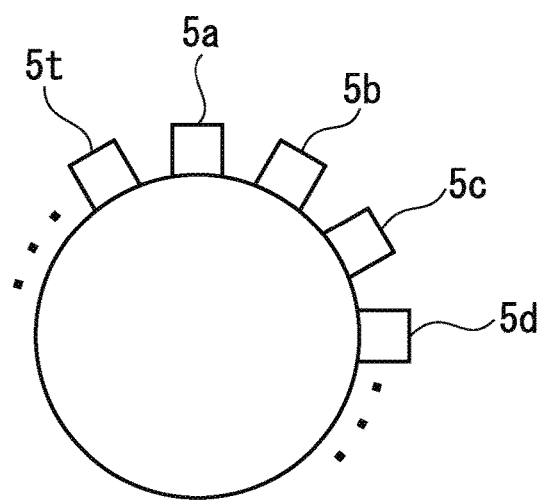
FIG. 2B is a second diagram showing the process of registering the information defining compatibility in the first embodiment according to the present invention.
FIG. 3 is a diagram showing an example of assignability in the first embodiment according to the present invention.

FIG. 2A is a first diagram showing a process of registering information defining compatibility in the first embodiment according to the present invention.

FIG. 2A shows an example of a compatibility master registration screen. A compatibility master registration screen 100 includes a search term input area 101, a manipulation area 102, and a compatibility information input and display area 103. The user inputs information defining compatibility between parts in the compatibility master registration screen 100. For example, the user inputs information such as a model of a part group that is a target of which compatibility is defined, and a part type to the search term input area 101, and performs a manipulation for pressing a "Search" button in the manipulation area 102. Then, the master registration unit 14 reads information on a part satisfying conditions from the part master of the storage unit 17, and displays the information in a field "Standard part" of the compatibility information input and display area 103. In the example of FIG. 2A, "AAAA" is displayed in the field "Standard part". The user may directly input a part code "AAAA" to the field "Standard part" instead of inputting information such as a model to perform searching. Subsequently, the user inputs information on parts compatible with the part "AAAA" and parts incompatible with the part "AAAA" to fields "compatible parts" and "Flag" in the compatibility information input and display area 103. In the example of a first line of FIG. 2A, a compatible part "AAAA-1" and a flag "1" are input to the standard part "AAAA". "1" in the field "Flag" indicates that there is compatibility between the standard part "AAAA" and the compatible part "AAAA-1". That is, the data displayed in the first line is information defining that there is compatibility between the part "AAAA" and the part "AAAA-1". "0" in the field "Flag" indicates that there is no compatibility. For example, data in a fourth line of the compatibility information input and display area 103 is information defining that there is no compatibility between the standard part "AAAA" and a compatible part "GGGG".

When the user presses a "Store" button in the manipulation area 102 on the compatibility master registration screen 100 shown in FIG. 2A, the master registration unit 14 registers content displayed in the compatibility information input and display area 103 in the compatibility master of the storage unit 17. FIG. 23 shows an example of the compatibility master. FIG. 2B is a second diagram showing a process of registering the information defining the compatibility in the first embodiment according to the present invention. Information indicating that there is compatibility with the part "AAAA" and the part "AAAA-1" input on the compatibility master registration screen 100 shown in FIG. 2A (a value of the "Flag" item is "1") or information indicating that there is no compatibility with the part "AAAA" and the part "GGGG" (the value of the "Flag" item is "0") is registered in the compatibility master.

Next, a meaning of the assignability in an example of a moving blade of a turbine will be described with reference to FIG. 3. FIG. 3 is a view showing an example of the assignability in the first embodiment according to the present invention. In general, a large number of "stages" in which a moving blade and a stationary blade form a set are provided in a turbine. FIG. 3 shows a schematic front view of moving blades 5 of any one of a plurality of stages provided in a turbine. A plurality of (for example, twenty) blades 5a, 5b, 5c, 5d, . . . , 5t are provided as the moving blades 5 in one stage. The operation plan creation device 10 of the first embodiment creates management plan data of, for example, the plurality of blades 5a constituting the moving blades 5 in a certain stage. In this case, the blades 5a to 5t mounted in one certain stage and used should be able to be mounted and used simultaneously. The operation plan creation unit 121 and the operation plan updating unit 122 select blades that can be mounted and used simultaneously, and performs creation or update of the operation plan data. For example, the assignability determination unit 13 determines that the blades 5a to 5t are assignable on the basis of the fact that the blades 5a to 5t are parts included in a simultaneously usable group, by referring to the part master to be described below. The operation plan creation unit 121 performs creation of the operation plan data for a combination of the blades 5a to 5t determined to be assignable by the assignability determination unit 13. The operation plan updating unit 122 updates the operation plan data created by the operation plan creation unit 121 with operation plan data after changing to a combination of the blades 5a to 5t including one or a plurality of new blades determined to be compatible by the assignability determination unit 13. The blades 5a to 5t after replacement are also configured by only blades that can be mounted in one stage and used simultaneously.

Next, the mountable part group information for determining the assignability determination from both of the compatibility between parts and simultaneous useability will be described.

FIG. 4 is a diagram showing the mountable part group information in the first embodiment according to the present invention. A left frame 172 in FIG. 4 shows an example of information defining a group of parts (blades) that can be mounted in moving blades in any one stage of a turbine registered in the part master. A representative code is a code set for a set of blades mounted in one stage of the turbine. A number in parentheses indicates the number of blades. For example, a group of "Representative code A (20)" at the top includes a combination of 20 blades, and specifically, 16 blades with "Code A" as a part code, two blades with "Code B", and two blades with "Code C". That is, information defining that the part with "Code A", the part with "Code B", and the part with "Code C" can be simultaneously mounted and used in one device (a moving blade of a certain stage is defined in the part master of the storage unit 17. Similarly, a group "Representative code D" includes a total of 20 blades including 16 blades with "Code D", 2 blades with "Code E", and 2 blades with "Code F". A group "Representative code G" includes a total of 20 blades including 16 blades with "Code H", 2 blades with "Code I", and 2 blades with "Code J".

An example of information registered in the compatibility master is shown in a center frame 175 of FIG. 4. For example, there is compatibility between a part with a part code "Code A" and a part with "Code D" (a value of "Flag" is "1"). Similarly, there is compatibility between a part with "Code B" and a part with "Code E" and between a part with "Code C" and a part with "Code F". On the other hand, there is no compatibility between a part with "Code A" and a part with "Code H" (the value of the "Flag" is "0"). Similarly, there is no compatibility between a part with "Code B" and a part with "Code I" and between a part with "Code C" and a part with "Code J".

The assignability determination unit 13 generates the mountable part group on the basis of these pieces of information. An example of the mountable part group is shown in a right frame 176 of FIG. 4.

A mountable part group 41 shows that, for a moving blade in which a set of blades indicated by "Representative code A" are mounted, a blade with part code "Code A" can be replaced with only a blade with "Code A" or a blade with "Code D".

A mountable part group 42 shows that, for a moving blade in which a set of blades indicated by "Representative code A" are mounted, a blade with part code "Code B" can be replaced with only a blade with "Code B" or a blade with "Code E".

A mountable part group 43 shows that, for a moving blade in which a set of blades indicated by "Representative code A" are mounted, a blade with part code "Code C" can be replaced with only a blade with "Code C" or a blade with "Code F".

A mountable part group 44 shows that, for a moving blade in which a set of blades indicated by "Representative code G" are mounted, a blade with part code "Code G" can be replaced with only a blade with "Code G", a blade with part code "Code I" can be replaced with only a blade with "Code I", and a blade with part code "Code J" can be replaced with only a blade with "Code J". That is, this shows that the group of "Representative code G" is not compatible with "Representative code A" or "Representative code D". When the assignability determination unit 13 generates the mountable part group information shown in the right frame 176 of FIG. 4, the assignability determination unit 13 records data thereof in the storage unit 17.

Next, a process of creating and updating the operation plan data in the operation plan creation device 10 in consideration of the assignability for parts will be described.

FIG. 5 is a diagram showing a configuration of the setting data acquired by the setting data acquisition unit 11. As shown in FIG. 5, the setting data includes the number of devices, planned number of years, plant name, model, delivered parts, combustion pattern, year of operation start, month of operation start, regular inspection interval, part life, replacement pattern, name of delivered parts, delivery part ID, constituent part, and the number of constituent parts.

The number of devices is the number (for example, 4) of units of devices that are operating in a certain plant. The planned number of years is the number (for example, 13) of years for which rotation of parts to be mounted in the device, that is, creation of an operation plan is performed. The plant name is a name (for example, PL1) of the plant in which the device is operated. The model is a model of the device. The delivered parts are parts (for example, representative code A) on which the part rotation is performed. The combustion pattern is a pattern of combustion (for example, gas only) in the device. The year of operation start is a year (for example, 2010) in which the operation of the device starts. The month of operation start is a month (for example, 10) in which the operation of the device starts. The regular inspection interval is a time (for example, 18000) indicating an interval between regular inspections of high-temperature parts mounted in the device. Part life is a cumulative operation time in which it is necessary to discard the high-temperature parts mounted in the device. The replacement pattern is the number (for example, 1) of intervals at which high-temperature parts to be mounted in the device are replaced. The delivered part name and the delivered part ID are the same as the delivered part. The constituent parts are names (for example, code A, code B, and code C) of parts configured of a plurality of elements. The number of constituent parts is the number (for example, 16, 2, and 2) of constituent parts. The constituent parts is information on parts that are candidates of assignment to the device. The candidate indicates that a constituent part cannot be assigned even if the constituent part is included in the setting data unless the constituent part is able to be assigned.

The operation plan creation unit 121 creates the operation plan data of parts when the operation of a certain plant starts, using the setting data and the mountable part group. The operation plan data created by the operation plan creation unit 121 includes data regarding the operation period of the part, data regarding a configuration of the high-temperature part, and information (a serial number or the like) on each part scheduled to be mounted.

Next, a process of creating the operation plan data in the operation plan creation unit 121 will be described using FIGS. 6 and 7.

FIG. 6 is a second diagram showing a process of the operation plan creation device in the first embodiment according to the present invention. FIG. 7 is a third diagram showing the process of the operation plan creation device in the first embodiment according to the present invention. An operation plan creation start screen 110 shown in FIG. 6 is an example of an image of a display screen (hereinafter referred to simply as a "display screen") that is created by the operation plan creation unit 121 after the setting data has been completed. A part rotation screen 120 shown in FIG. 7 is an example of a display screen showing an operation plan of parts that is created by the operation plan creation unit 121.

In the operation plan creation start screen 110 shown in FIG. 6, when the input reception unit 15 detects a pressing manipulation with respect to a button B1 by the user, the operation plan creation unit 121 creates the part rotation screen 120 using the setting data. The output unit 16 displays the part rotation screen 120 of FIG. 7 on the display.

A configuration of data that is displayed on the part rotation screen 120 will be described with reference to FIG. 7. As shown in FIG. 7, data corresponding to a plant name ("PL1") and year information D1 corresponding to the year in which the operation starts is displayed in the part rotation screen 120. For each of devices (first to fourth devices) that are operated in a relevant plant, data corresponding to each of a graph D2 indicating an operation period of parts, configuration information D3 of parts to be mounted in the device, and configuration information D4 of parts to be removed through regular inspection is displayed in the part rotation screen 120. A button B2 is provided in the part rotation screen 120. When the input reception unit 15 detects that the button B2 is pressed as will be described below, the operation plan updating unit 122 starts an updating process.

(Creation of Operation Plan Data)

Figure 7:
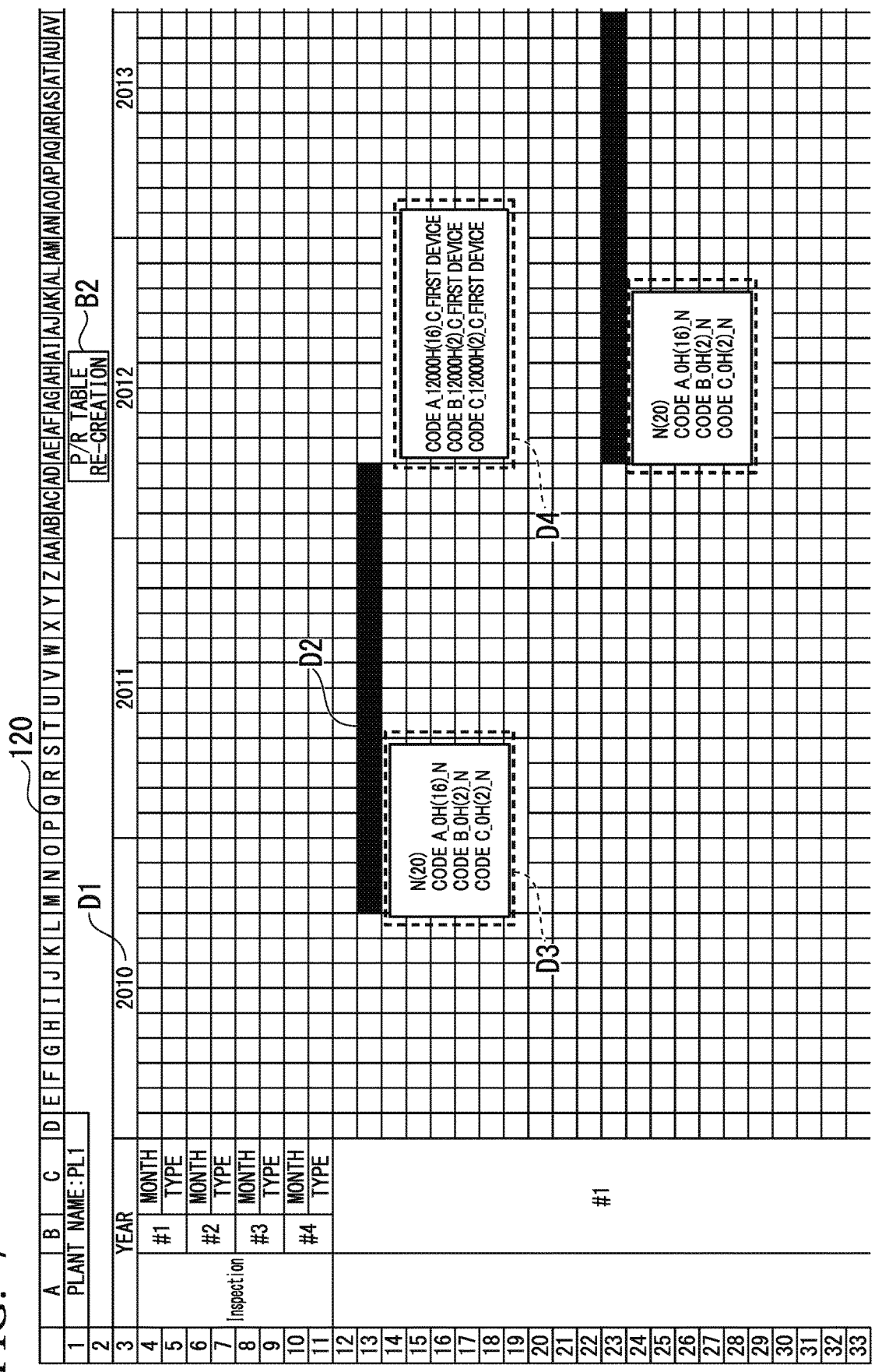
FIG. 7 is a third diagram showing the process of the operation plan creation device in the first embodiment according to the present invention.

In the example shown in FIG. 7, an operation plan in which two sets of units including a plurality of parts are alternately mounted in the first device, for example, is shown. For example, when the unit mounted in the first device is removed in regular inspection at the time of operation start, the other unit is mounted in the first device and operated. When next regular inspection starts, the unit mounted in the first device is removed, and a unit removed in the previous regular inspection is mounted in the first device again and operated. The operation plan creation unit 121 creates the part rotation screen 120 including the plant name, the year information D1 corresponding to the year in which the operation starts, the graph D2 corresponding to an operation period of high-temperature parts, the configuration information D3 of parts, and the configuration information D4 of parts to be removed through regular inspection using the setting data. For the graph D2 corresponding to the operation period of the parts, the operation plan creation unit 121, for example, calculates the operation period of the part until the part is removed through regular inspection from the year in which the operation starts and a month in which the operation starts, which are included in the setting data, and generates an image of the graph D2 of the operation period matching the calculated operation period. A performance schedule for regular inspection (once a year, once every two years, or the like), and an operation time (24 hours, 20 hours, or the like) per day for the device, or the like is stored in the storage unit 17 in advance, and the operation plan creation unit 121 calculates the operation period using this information.

The configuration information D3 of the parts will be described. As shown in FIG. 7, a portion "N(20)" in the data D3 regarding the configuration of the parts indicates the number of new parts. Specifically, the code A is 16, the code B is 2, and the code C is 2, as shown in the configuration information D3. Portions other than "N(20)" in the configuration information D3 of the parts indicate a configuration of the parts to be mounted in the device. For example, "Code A_0H(16)_N" indicates data of "constituent part name_expended time (number of parts)_treatment category". In the example shown in FIG. 5, since it is the time at which the operation starts, the expended time is "0" time (H). The treatment category corresponds to a state of the high-temperature part or a treatment method for the high-temperature part, and includes N(new), R (repair), C (continuous use), S (disposal due to end of life or disposal due to non-repairable), O (others), and the like. In the example shown in FIG. 5, since the high-temperature parts are all new parts, the treatment category is "N(new)". The configuration information D3 indicates that 16 new parts with "Code A" of which the expended time is 0 hours, two new parts with "Code B" of which the expended time is 0 hours, and two new parts with "Code C" of which the expended time is 0 hours are mounted.

When the part rotation screen 120 is created, the operation plan creation unit 121 instructs the assignability determination unit 13 to perform a determination as to whether or not the three parts ("Code A", "Code B", and "Code C") can be simultaneously mounted. The assignability determination unit 13 determines that all the three parts can be mounted because the parts belong to the representative code A, on the basis of the mountable part group (a right frame 176 in FIG. 4) recorded in the storage unit 17. The operation plan creation unit 121 generates the graph D2 and the configuration information D3 on the basis of a result of the determination. When the determination result of the assignability determination unit 13 indicates that the parts cannot be mounted, the operation plan creation unit 121 may generate, for example, an error message and prompt the setting data to be input again via the output unit 16 or present candidates for mountable parts. Alternatively, when "Code C" cannot be assigned and "Code C1" can be assigned, the operation plan creation unit 121 may create the configuration information D3 in which the "Code C" has been changed to "Code C1" based on the mountable part group. In this case, the output unit 16 may display, for example, "Code C1" in red.

The configuration information D4 of the parts to be removed through inspection will be described. The configuration information D4 of parts indicates the configuration of the parts to be removed from the device. For example, "Code A_12000H (16)_C_first device" indicates data of "constituent part name_expended time (number of parts)_treatment category_destination". In the example shown in FIG. 7, the expended time is "12000" H, corresponding to the graph D2 of the operation period calculated by the operation plan creation unit 121. The expended time corresponds to the operation period (time of an interval between inspections). Calculation of the expended time is performed on the basis of a value of the regular inspection interval of the setting data (FIG. 5). For example, when the regular inspection interval time of each device is set in the setting data, the operation plan creation unit 121 generates the configuration information D4 of parts to be adjacent to the graph D2 indicating the operation period, in consideration of an operation during the interval. The length of a line of the graph D2 corresponds to that drawn by converting the interval time to months, in which 8000H is one year. The destination of the configuration information D4 corresponds to a device (the first device in the example of FIG. 7) to be mounted again after completion of the inspection, after the part has been removed through regular inspection. In the configuration information D4 of parts, data of remarks may be added after the destination. In the remarks, information indicating that a new part has been arranged, information indicating that repair of a part has been arranged, or the like is added.

(Updating of Operation Plan Data)

The operation plan updating unit 122 updates the operation plan data of the parts at time at which the operation starts created by the operation plan creation unit 121, on the basis of the actual operation record of the device. The operation plan data updated by the operation plan updating unit 122 includes data regarding the operation period of the part and data regarding the configuration of the part. For example, the operation plan updating unit 122 generates the graph D2 corresponding to the operation period of the part displayed on the part rotation screen 120 on the basis of information on the regular inspection performed on the part (for example, a month in which the inspection is performed), and updates the configuration information (expended time or the like) of the parts to be removed for regular inspection. Further, the operation plan updating unit 122 reflects the actual operation record (for example, cumulative operation time) of the parts in the configuration information (expended time or the like) of the parts to be removed for regular inspection to update the configuration information of the parts. The operation plan updating unit 122 uses, for example, the cumulative operation time of the device included in the operation record data as the actual operation record of the parts. The cumulative operation time of the device is calculated on the basis of, for example, the time indicated by event information indicating starting and stopping of the device acquired by the setting data acquisition unit 11, and is recorded as a part of the operation record data.

When the operation plan data is updated, the setting data acquisition unit 11 acquires information on the part that is an assignment candidate, in addition to information on the cumulative operation time of the device (the event information indicating starting and stopping of the device, or the like). For example, a user who performs the operation plan inputs information on parts to be mounted in the first to fourth devices or spare parts to the operation plan creation device 10, and the setting data acquisition unit 11 records the input information on the parts in the storage unit 17 as the assignment candidate data. The operation plan updating unit 122 can generate a combination of optimal assignable parts from the recorded parts, and create an operation plan when the parts in the combination have been mounted. For example, the setting data acquisition unit 11 acquires 16 "Code A", two "Code B", and two "Code C" as the information on the parts that are assignment candidates. Next, a process of updating the operation plan data will be described using FIGS. 8 and 9.

Figure 8:
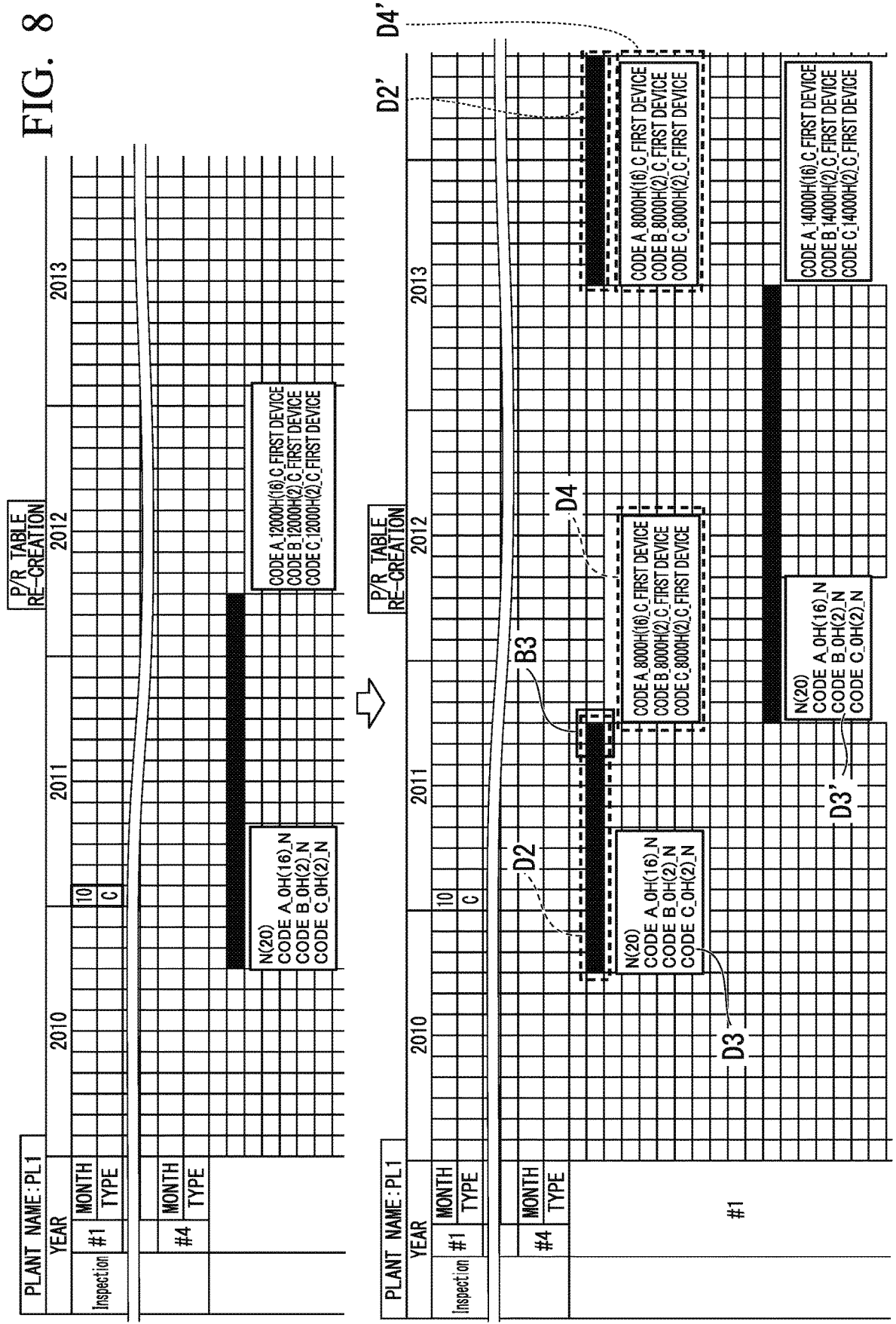
FIG. 8 is a fourth diagram showing the process of the operation plan creation device in the first embodiment according to the present invention.

FIG. 8 is a fourth diagram showing a process of the operation plan creation device in the first embodiment according to the present invention. FIG. 9 is a fifth diagram showing a process of the operation plan creation device in the first embodiment according to the present invention. The processes of FIGS. 8 and 9 are started after the operation plan updating unit 122 reads the operation plan data of the plant selected by the user from the operation plan data recorded in the storage unit 17 and displays the part rotation screen 120 of the high-temperature parts to be operated at the plant selected by the user.

Updating of the operation period of the parts and the configuration information of the part displayed on the part rotation screen 120 will be described with reference to FIG. 8. As shown in FIG. 8, the input reception unit 15 receives an input of data "10" corresponding to October which is a month in which the regular inspection is performed by the user and data "C" corresponding to an inspection pattern to an area of "2011" that is an operation year of the first device in the part rotation screen 120 (upper figure in FIG. 8). The operation plan updating unit 122 determines that the regular inspection has been executed in October 2011, and performs updating of the operation plan data. It is assumed that the operation plan updating unit 122 can specify the parts that are targets of the regular inspection on the basis of, for example, the elapsed time from the start of the operation of the first device. Alternatively, the user may input information for specifying the parts that are inspection targets. Alternatively, the operation plan updating unit 122 may select an optimal part as an inspection target on the basis of the elapsed time from operation start of the first device, an operation pattern during the elapsed time, a degree of deterioration of parts based on the elapsed time or the operation pattern, a degree of deterioration of the part at the time of the start of the operation, life set for the part, and the like, and specify the part as a part that is an inspection target.

After the month in which the regular inspection is performed and the inspection pattern have been input, the input reception unit 15 subsequently detects a pressing manipulation with respect to the button B2 provided in the part rotation screen 120 by the user. Then, the operation plan updating unit 122 recalculates the operation period of the part to be removed for regular inspection, on the basis of the data "10" corresponding to the month in which the regular inspection is performed. The operation plan updating unit 122 updates the graph D2, the configuration information of parts D3 and D4, the graph D2', and the configuration information of parts D4' on the part rotation screen 120, as indicated by dotted line boxes R1 to R4 in a lower portion of FIG. 8. The operation plan updating unit 122 updates, for example, the graph D2 corresponding to the operation periods of all parts, and updates configuration information (expended time or the like) of parts to be removed for regular inspection. In the example shown in FIG. 8, the operation plan updating unit 122 calculates the expended time from the operation start to the date when the inspection is started (October 2011), converts the calculated expended time to a month, and creates the graph D2 and the configuration information D4 of parts corresponding to the operation period. More specifically, in the case of FIG. 8, since the month in which the inspection was performed was brought forward by one and a half years after the operation started to one year afterward, the graph D2 becomes shorter than the graph D2 shown in FIG. 7, and the expended time included in the configuration information D4 of parts has also been updated from 12,000 H to 8000 H.

The operation plan with replacement parts in the first device after regular inspection will be described herein. Configuration information of parts D3' in a lower portion of FIG. 8 indicates part configuration after replacement. This part configuration is acquired as the information on parts that are assignment candidates by the setting data acquisition unit 11. Since this part configuration is the same as 16 "Code A", two "Code B" and two "Code C" before replacement, the assignability determination unit 13 determines that the combination of these parts can be assigned. Accordingly, the operation plan updating unit 122 can create the operation plan data with a correct configuration in which parts replacement has been performed using assignable parts.

Further, when the setting data acquisition unit 11 has acquired information on candidates for correct combinations of a plurality of parts, an optimal combination may be selected and operation plan data may be created when the selected parts have been mounted. For example, it is assumed that information on parts including a group of 16 "Code A", two "Code B", and two "Code C" and a group of 16 "Code D", two "Code E", and two "Code F" as spare parts for the first to fourth devices has been input, and the setting data acquisition unit 11 has recorded such information in the storage unit 17 as information on a part that is an assignment candidate (assignment candidate data). In this case, the assignability determination unit 13 first determines the assignability based on the mountable part group for at least the two groups. According to the mountable part group shown in FIG. 4, both can be assigned. Then, the operation plan updating unit 122 selects an optimal group from the two groups. For example, the operation plan updating unit 122 simulates, for each of the two groups, an operation plan in a predetermined period of time (for example, 10 years) when the group has been adopted. The operation plan to be simulated differs depending on scheduled inspection of second to fourth other devices and scheduled part replacement after inspection, a remaining life of each part, deterioration prediction of parts due to an operation load of the first to fourth devices, or the like. For example, when which of the two groups has been selected, the operation plan updating unit 122 evaluates whether or not the number of new purchased parts within a predetermined period is small and selects the group of parts when the number of new purchased parts is small. For example, when the number of new purchased parts is small in the case of replacement with a group of 16 "Code D", two "Code E", and two "Code F", the operation plan updating unit 122 creates operation plan data when the replacement with the group of 16 "Code D", two "Code E", and two "Code F" has been performed. In this case, information such as "Code D_0H(16)_N", "Code E_0H(2)_N", and "Code F_0H(2)_N" is displayed in the configuration information of parts D3', for example.

The applicant has filed an application for selection of an optimal part in the creation of an operation plan for parts (Japanese Patent Application No. 2014-78102) This specification describes evaluating an operation plan according to an evaluation function including at least one of a total remaining life of all parts, a predetermined evaluation scale, the number of new parts, and the number of discarded parts as a variable, and adopting a combination of parts when a value of the evaluation function is minimized. In the first embodiment, it is possible to select the parts to be mounted after the regular inspection using the part selection method described in Japanese Patent Application No. 2014-78102, in addition to the determination as to the assignability in the assignability determination unit 13.

Next, another example of the process of updating configuration information of parts will be described using FIGS. 8 and 9. As shown in FIG. 8, when the input reception unit 15 detects a manipulation of the user with respect to an end portion B3 of the graph D2 indicating the operation period of the parts drawn in the part rotation screen 120, the operation plan updating unit 122 generates an input and correction form screen 200 and displays the input and correction form screen 200 on the display via the output unit 16 (FIG. 9). An example of the input and correction form screen 200 is shown in FIG. 9. The operation plan updating unit 122 displays content of the configuration information D4 of parts in a specification area 201. The operation plan updating unit 122 displays the operation period shown in the graph D2 in a period display field 203. The user can input any numerical value in an elapsed time input field 202. The user inputs a cumulative operation time (for example, 7900) as an actual operation record, and presses an update button. When the input reception unit 15 receives this manipulation, the operation plan updating unit 122 generates the part rotation screen 120 in which configuration information (expended time) of parts has been updated with a value reflected in the cumulative operation time. In the part rotation screen 120 after the updating, "Code A_7900H(16)_ C_first device", "Code B_7900H(2)_C_First device", and "Code C_7900H(2)_C_First device" are displayed in the configuration information D4 and D4' of FIG. 8. In the input and correction form screen 200, the user can perform correction of parts or addition of new parts. In this case, for example, when the user presses the update button, the assignability determination unit 13 perform a determination of an assignability for the parts.

Next, a flow of a process of creating and updating the operation plan data in the operation plan creation device 10 will be described.

Figure 10:
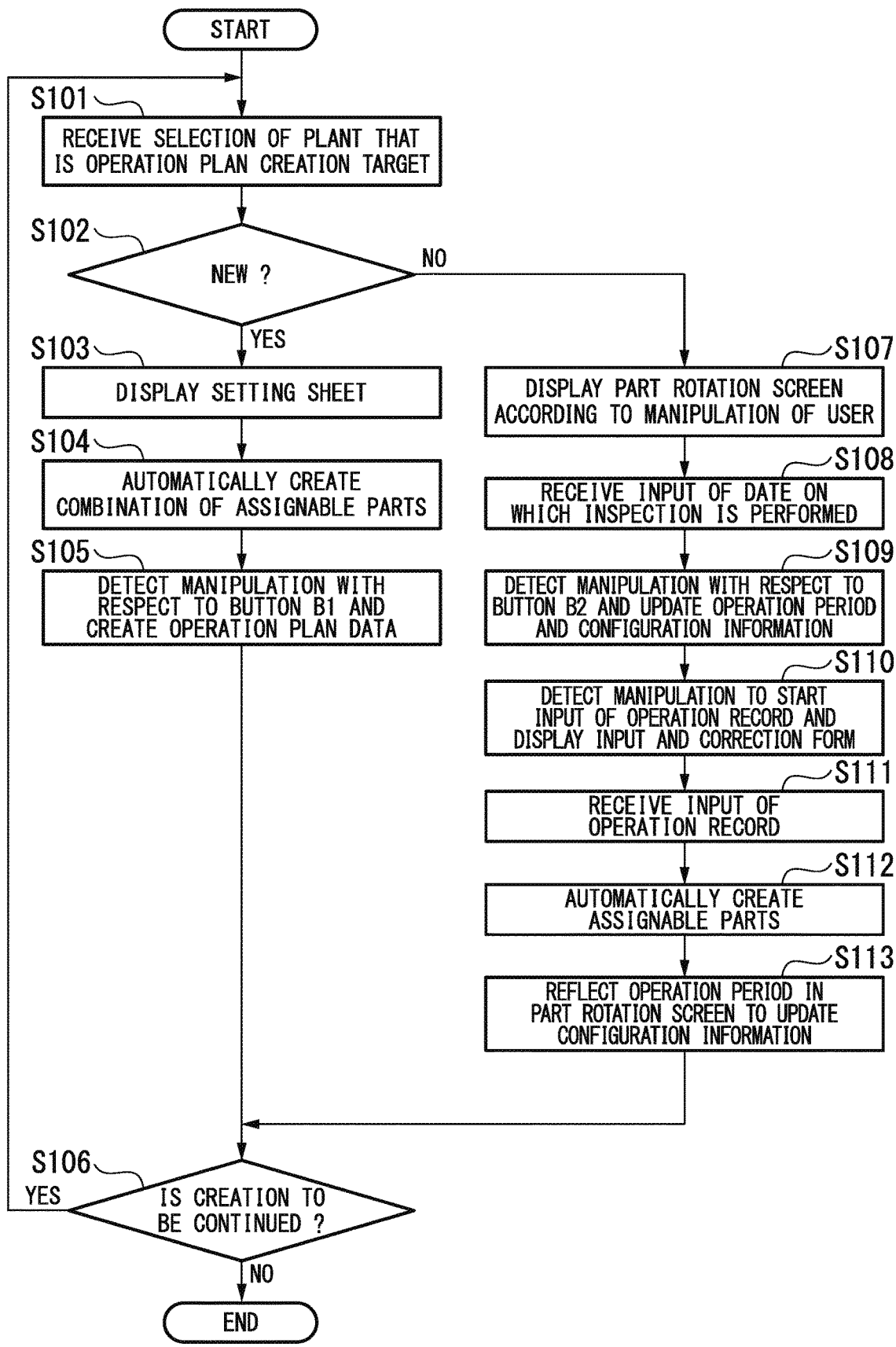
FIG. 10 is a flowchart showing an example of a process of the operation plan creation device in the first embodiment according to the present invention.

FIG. 10 is a flowchart showing an example of a process of the operation plan creation device in the first embodiment according to the present invention. As a premise, the part master, the compatibility master, and the mountable part group are recorded in the storage unit 17. The assignment candidate data is recorded in the storage unit 17. First, the input reception unit 15 receives a selection of a plant that is an operation plan creation target from the user on the display screen (an interface) displayed on the display (step S101). Then, the operation plan creation control unit 12 determines whether or not an operation plan to be created for the selected plant is a new one (step S102). Specifically, the operation plan creation control unit 12 determines whether or not there is operation plan data corresponding to the plant selected by the user among the operation plan data stored in the storage unit 17.

When the operation plan data is new one (Yes in step S102), the operation plan creation unit 121 generates the operation plan creation start screen 110 (FIG. 6) and displays the operation plan creation start screen 110 on the display via the output unit 16 (step S103). The user inputs the setting data shown in FIG. 5 to the operation plan creation start screen 110 and presses the button B1. Then, the input reception unit 15 receives the input. Then, the operation plan creation unit 121 automatically creates a combination of assignable parts in consideration of the compatibility (step S104). For example, the assignability determination unit 13 refers to the mountable part group of the storage unit 17 to determine whether or not parts included in the setting data can be simultaneously mounted and used. The operation plan creation unit 121 creates a combination of parts determined to be assignable by the assignability determination unit 13. For example, when the constituent part included in the setting data is "Code A", the number of constituent parts is "16", the constituent part is "Code B", the number of constituent parts is "2", and the constituent part is "Code C", and the number of constituent parts is "2", these are an assignable combination according to the mountable part group shown in FIG. 4. The assignability determination unit 13 determines that these constituent parts are assignable. The operation plan creation unit 121 creates a combination of constituent parts included in the setting data as a combination of assignable parts. For example, when the constituent parts included in the setting data are not a combination of assignable parts, the operation plan creation unit 121 may automatically create a combination of any assignable parts on the basis of the combination of assignable parts recorded in the mountable part group.

Then, the operation plan creation unit 121 automatically creates the operation plan data for assignable parts (step S105). The operation plan data that is automatically created in step S105 is data regarding the operation plan of the parts at time at which the operation starts. The operation plan creation unit 121 records the created operation plan data in the storage unit 17.

After the operation plan is created, the operation plan creation control unit 12 determines whether or not the creation process is to be continued (step S106). For example, the operation plan creation control unit 12 displays a display screen for confirming whether or not the creation of operation plan data is to be continued, and determines whether or not a manipulation to continue the creation is received from the user. When the creation process is continued (Yes in step S106), the process returns to step S101. When the creation process is not continued (No in step S106), the process shown in FIG. 10 ends.

In step S102 described above, when the operation plan data created for the selected plant is not new one (No in step S102), the operation plan creation control unit 12 determines to update the created operation plan data. In response to a manipulation of the user, the operation plan updating unit 122 generates the part rotation screen 120 (see, for example, FIG. 7) of the plant that is a target, and the output unit displays an image of the screen on the display (step S107).

Then, as described with reference to FIG. 8, the input reception unit 15 receives an input of a year and a month on which regular inspection is performed on the part rotation screen 120 (step S108). The input reception unit 15 detects a pressing manipulation with respect to the button B2 by the user. Then, the operation plan updating unit 122 generates the part rotation screen 120 in which the graph D2 indicating the operation period and the configuration information D4 of parts have been updated (step S109). The output unit 16 displays the part rotation screen 120 after the updating. For example, when the input reception unit 15 receives an input of data "10" corresponding to October which is a month in which the regular inspection is performed and data "C" corresponding to an inspection pattern to the area of "2011" that is an operation year of the first device, the operation plan updating unit 122 determines that the regular inspection has been performed in October 2011. Then, when the input reception unit 15 detects a pressing manipulation of the user with respect to the button B2 provided in the part rotation screen 120, the operation plan updating unit 122 recalculates the operation period on the basis of the data "10" corresponding to the month in which the regular inspection is performed, and updates the graph D2 corresponding to the recalculated operation period and the configuration information D4 (expended time or the like) of the parts to be removed for regular inspection.

Then, the input reception unit 15 detects a manipulation to start an input of the operation record. For example, the input reception unit 15 detects a manipulation with respect to an end portion of the graph D2 indicating the operation period of the parts included in the part rotation screen 120 as the manipulation to start an input of the operation record. Then, the operation plan updating unit 122 creates the input and correction form screen 200, and displays the input and correction form screen 200 on the display via the output unit 16 (step S110).

Subsequently, after the input reception unit 15 receives the input of the operation record on the input and correction form screen 200 (step S111), the input reception unit 15 further detects a manipulation with respect to the update button provided on the input and correction form screen 200. Then, the operation plan updating unit 122 automatically creates a combination of assignable parts in consideration of compatibility (step S112). For example, the assignability determination unit 13 determines whether the parts as the assignment candidates can be simultaneously mounted and used or there is compatibility with the part before replacement, by referring to the assignment candidate data and the mountable part group stored in the storage unit 17. The operation plan updating unit 122 creates a combination of parts determined to be assignable by the assignability determination unit 13. Alternatively, the operation plan updating unit 122 may further create a combination of parts with the smallest number of new purchased parts through an optimization logic for part selection. For example, when the constituent part included in the information on the part that is an assignment candidate is not a combination of assignable parts, the operation plan updating unit 122 may automatically create and present any combination of assignable parts on the basis of a combination of assignable parts recorded in the mountable part group. The user can consider purchase of the part with reference to the presented part.

Then, the operation plan updating unit 122 reflects the operation record input to the input field 202 of the input and correction form screen 200 in the part rotation screen 120 to update the configuration information D4 of parts (expended time or the like) (step S113). The operation plan creation control unit 12 proceeds to the determination of step S106.

According to the first embodiment, the operation plan creation device 10 can automatically update the operation period and the configuration information of the parts present in an initial operation plan on the part rotation screen 120 on as is of the month in which the regular inspection is performed. In this case, it is possible to automatically create a combination of assignable parts from the parts and replacement part candidates included in the setting data in consideration of the assignability such as the compatibility of parts. Further, the operation plan creation device 10 causes the user to input an actual operation record of the device (for example, the first to fourth devices) or parts after replacement to the input and correction form screen 200, reflects the input operation record, and updates the operation period and the configuration information in the part rotation screen 120. In this case, it is possible to check the assignability for parts and automatically create a combination of assignable parts in consideration of compatibility or the like. Accordingly, according to the first embodiment, it is possible to easily update the information on the operation plan of the high-temperature parts. It is possible to accurately and automatically create a part management plan that is important for a business operator operating a plant or the like, and to achieve efficiency of work. Since it is possible to ascertain an appropriate number of parts that can be assigned in advance, it is possible to accurately predict a demand for parts.

FIG. 11 is a diagram showing an example of a display screen showing the number of parts in the first embodiment according to the present invention. Regarding demand prediction for parts, the operation plan creation device 10 can display data (for example, 001) obtained by totaling a total number of parts to be mounted in the device, data (for example, 002) obtained by totaling a total number of parts corresponds to the treatment category for each device, data for remarks (for example, 003), and the like on a number-of-part list screen (FIG. 11). Accordingly, the user can easily ascertain the information for each part mounted in the device.

Figure 12:
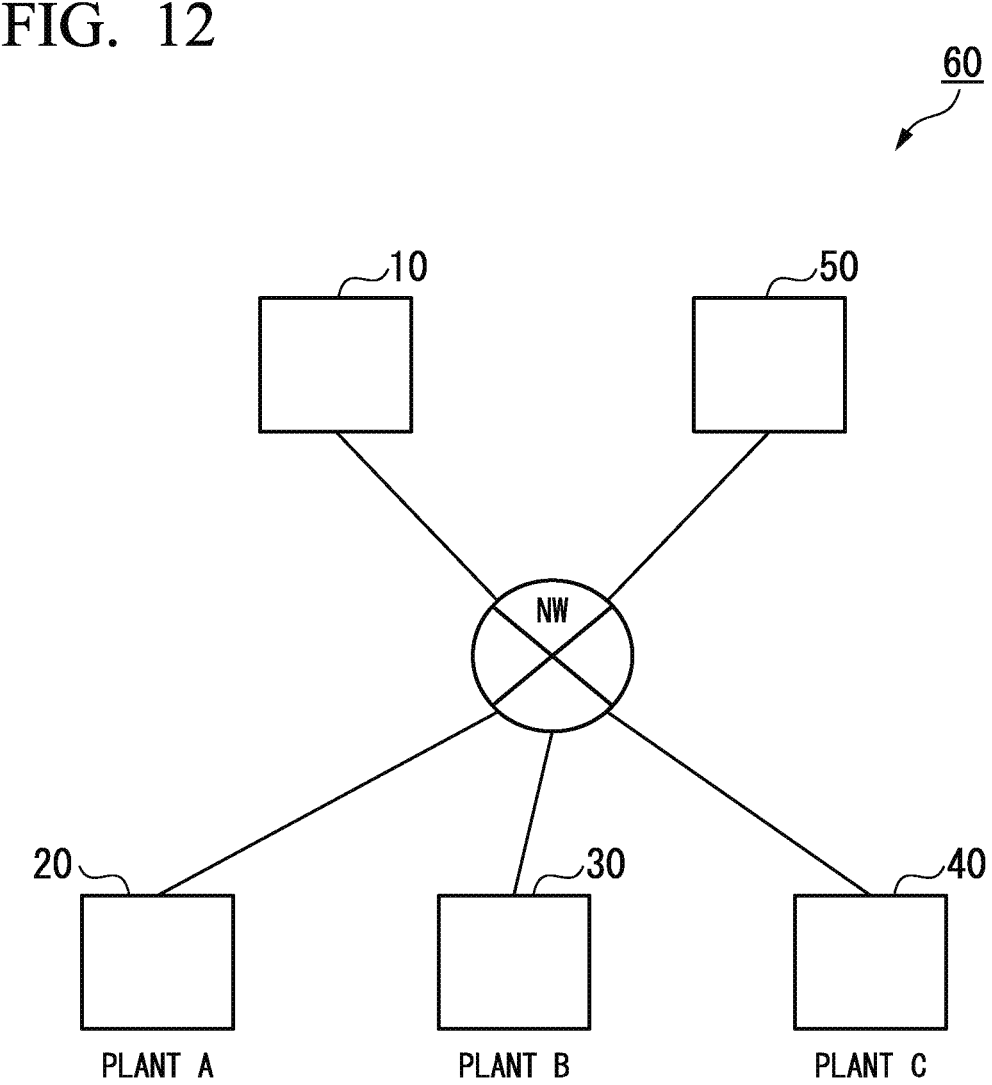
FIG. 12 is a schematic diagram showing an example of an operation plan creation system according to the first embodiment of the present invention.

FIG. 12 is a schematic diagram showing an example of the operation plan creation system in the first embodiment according to the present invention. The operation plan creation system 60 is, for example, a system in which a manufacturer that supplies parts and a business operator who performs an operation of a device such as a plant jointly perform the part management plan. For example, the operation plan creation system 60 includes the operation plan creation device 10, a device 20 provided in a plant A, a device 30 provided in a plant B, a device 40 provided in a plant C, and a device 50 on the manufacturer side. The operation plan creation device 10, the device 20, the device 30, the device 40, and the device 50 are communicatively connected via a network. Examples of the device 20, the device 30, and the device 40 include a control device that acquires measurement values detected by sensors provided in each plant, and a computer to be used by a person in charge for operation of the plant. The device 50 is a computer that is used by a person in charge of the manufacturer.

For example, the operation plan creation device 10 acquires operation data indicating a state of a device in which the parts that are targets of the management plan to be operated in the plant transmitted via the communication unit 18 by the devices 20, 30, and 40 have been mounted, and the operation plan creation control unit 12 calculates an operation situation of the device from the received operation data. For example, in a case in which the device in which the parts that are targets of the management plan have been mounted is a gas turbine, an output of the gas turbine or the event information indicating start and stop are received, and the operation plan creation control unit 12 calculates cumulative operation time of the gas turbine (operation period of parts) on the basis of such information. For example, the setting data acquisition unit 11 acquires setting data including an interval of the regular inspection or the like, which has been input to the device 20 by the person in charge of time plant A via the communication unit 18 and transmitted by the device 20, records the setting data in the storage unit 17. For example, the master registration unit 14 acquires data of part life included in compatibility data or setting data, which has been input to the device 50 by the person in charge of the manufacturer and transmitted by the device 50 via the communication unit 18, and records the data in the storage unit 17.

Thus, by operating the operation plan creation device 10 with the interface provided on both the plant side and the manufacturer side, it is possible to directly acquire the plant operation data to thereby acquire accurate information such as the cumulative operation time and the operation load to be used for evaluation of a degree of wear of parts, and to create more accurate operation plan data. In the related art, the operation plan of parts is independently formulated on the plant side and is often not disclosed to the manufacturer side, but in this case, the manufacturer side is requested to deliver the parts in a short delivery period of time and a parts production plan is likely to be confused. With the operation plan creation system 60 of the first embodiment, the manufacturer inputs information such as parts life and compatibility master held by the manufacturer side to the operation plan creation device 10, and the plant operation side inputs plan data for matters to be determined by the plant operation side, such as the operation plan, to the operation plan creation device 10. Accordingly, the plant operation side can create the management plan with correct parts guaranteed to be assignable. Since the manufacturer side can ascertain the parts necessary in the future by the plants A to C, it is possible to perform manufacture of the necessary parts in advance and reliably deliver the necessary parts.

Second Embodiment

In the first embodiment, the function of confirming a mounting possibility or compatibility between parts to create and update a part management plan has been provided. In a second embodiment, a function of correction to a once created management plan, and a function of reserving parts at the time of creation and updating of the management plan are provided. Hereinafter, an operation plan creation device according to a second embodiment of the present invention will be described with reference to FIGS. 13 to 21.

FIG. 13 is a first diagram showing an operation plan correction process according to the second embodiment of the present invention. FIG. 14 is a second diagram showing the operation plan correction process in the second embodiment according to the present invention.

When the input reception unit 15 detects a predetermined manipulation of the user with respect to the graph D2 indicating the operation period of the parts drawn on the part rotation screen 120 (FIG. 7), the operation plan updating unit 122 generates the part correction screen 300 and displays the part correction screen 300 on the display through the output unit 16 (FIG. 13). One continuous operation period represented by the graph D2 is indicated by "operation X" (X is an integer), and a set of parts is mounted in one "operation X". An upper portion of FIG. 13 shows an example of the part correction screen 300 of operation 1 and a lower portion of FIG. 13 shows an example of the part correction screen 300 of operation 2. As shown FIG. 13, information such as a part code, serial number, operation time, the number of start, and stop times, and the number of parts for parts planned to be mounted in the device during a manipulated operation period is displayed in the part correction screen 300. In the part correction screen 300, parts are displayed not in units of part codes but in units of individual parts (in units of serial numbers). For example, in an initial display state, parts having the same operation time and the same number of start and stop times are aggregated in units of part codes, and the number of aggregated parts is displayed in the number of parts. A button for switching between a display and a non-display of parts in units of serial numbers may be displayed in an "Operation time" field, aggregated information may be developed by a manipulation of the user with respect to this button, and information such as the operation time may be displayed for each part. When a part code to be displayed in a "part code designation" field is input and the "Search" button is pressed, detailed information of the designated part code is displayed. Information such as a part classification and a part type that are higher-level concepts than the part code in a part management system may be displayed in the part correction screen 300, and a "part classification code designation" field and a "part type code designation" field may be displayed so that search can be performed for the part classification and the part type.

When the user selects, for example, a row of serial No "7FA00008" of operation 1 and performs a drag and drop manipulation up to a row of serial No "7FA00004" of operation 2 in a state in which the part correction screen 300 of operation 1 and the part correction screen 300 of operation 2 have been displayed, two parts are replaced. That is, in the part correction screen 300, the part with serial No "7FA00004" is displayed as a part to be mounted in the device during the operation period of operation 1 and the part with serial No "7F400008" is displayed as a part to be mounted in the device during the operation period of operation 2.

When the user presses the "Decide" button, the operation plan updating unit 122 determines whether the replaced part has not been mounted in another operation X in a period of time overlapping a period of time in which the part is planned to be mounted and a total number of parts to be mounted in the device is correct. The assignability determination unit 13 may determine the assignability or compatibility between parts. When there is no abnormality as a result of the determination, the operation plan updating unit 122 rewrites the information on the operation plan data of operation 1 and operation 2 recorded in the storage unit 17.

When the user presses a "Search" button, the operation plan updating unit 122 generates an assignable part display screen 310 (FIG. 14) and displays the assignable part display screen 310 on the display via the output unit 16. FIG. 14 is a third diagram showing the process of correcting the operation plan according to the second embodiment of the present invention. An example of the assignable part display screen 310 is shown in FIG. 14. When a part code to be searched is selected in the "part code designation" field of the assignable part display screen 310, the operation plan updating unit 122 reads an assignable part with the designated part code from the assignment candidate data of the storage unit 17 and generates a screen in which these parts are displayed in units of serial numbers. The assignable part is a part that is not mounted in the own device or another device during a period overlapping the operation period (for example, operation 1) that is a target, or a part for which there is no designation of a reserve part, to be described below. A list of assignable parts is displayed on the assignable part display screen 310, and the user, for example, selects a row of serial No "7FA00102" in the assignable part display screen 310, and performs a drag and drop manipulation up to the row of serial No "7FA00008" of operation 1 of the part correction screen 300. Then, the parts on both sides are replaced and displayed. When the user presses the "Decide" button in the part correction screen 300, a part with serial No "7FA00102" is set as a part to be mounted in the device during the operation period of operation 1, and a part with serial No "7FA00008" is recorded in the storage unit 17 as assignment candidate data. Accordingly, when the part of "7FA00008" is not desired to be mounted during the operation period of operation 1 for some reason, a new part (serial No "7FA00102") with an operation time of 0 hours may be corrected to a plan in which operation 1 is mounted. In the assignable part display screen 310, information such as part classification and part type may be displayed, and a "part classification code designation" field and a "part type code designation" field may be displayed so that search can be performed for the part classification and the part type.

When the user presses a "Add new" button in the part correction screen 300 or the assignable part display screen 310, the operation plan updating unit 122 generates a new part addition screen 320 (FIG. 15) and displays the new part addition screen 320 on the display via the output unit 16. FIG. 15 is a fourth diagram showing the operation plan correction process in the second embodiment according to the present invention. An example of the new part addition screen 320 is shown in FIG. 15. When the new part addition screen 320 is displayed, the user manually inputs data of a new part that is not present in the assignment candidate data of the storage unit 17. Information on the part classification and the part type may be displayed in the new part addition screen 320, and the user, for example, can input a serial number and select the part classification, the part type, and the part code from a drop-down list. The user inputs an operation time, the number of start and stop times, and the number of parts. When the user presses an "Add row" button, a new row is added. When there are a large number of parts to be newly registered, the user can input all the parts by adding rows.

When an "Add new part" button is pressed in the part correction screen 300 and the new part addition screen 320 is displayed, the user, for example, selects the row of serial No "7FA00104" of the new part addition screen 320, and performs a drag and drop manipulation up to the row of serial No "7FA00008" of operation 1 of the part correction screen 300. Then, the part with the serial No "7FA00104" is displayed in the part correction screen 300 of the operation 1, instead of the serial No. "7FA00008". When the user presses the "Decide" button in the part correction screen 300, the operation plan data of the storage unit 17 is updated such that the part with serial No "7FA00104" is a part to be mounted in the first device in the operation period of operation 1, and the part with serial No "7FA00008" is recorded in the storage unit 17 as assignment candidate data.

When the "Add new part" button is pressed on the assignable part display screen 310 and the new part addition screen 320 is displayed, the user, for example, selects the row of serial No "7FA00104" of the new part addition screen 320 and performs a drag and drop manipulation up to the assignable part display screen 310. Then, the part with serial No "7FA00104" is added to a list of the assignable part display screen 310 and displayed. Further, the user selects the "part code" field of the row of serial No "7FA00104" or the row of serial No "7FA00105", and drags and drops the part code onto the assignable part display screen 310. Then, all parts ("7FA00104" and "7FA00105") with part code "AAAA" are added to the list of the assignable part display screen 310 and displayed. When the user presses the "Decide" button, the part added from the new part addition screen 320 to the assignable part display screen 310 is recorded in the storage unit 17 as assignment candidate data.

Figures 16, 17:
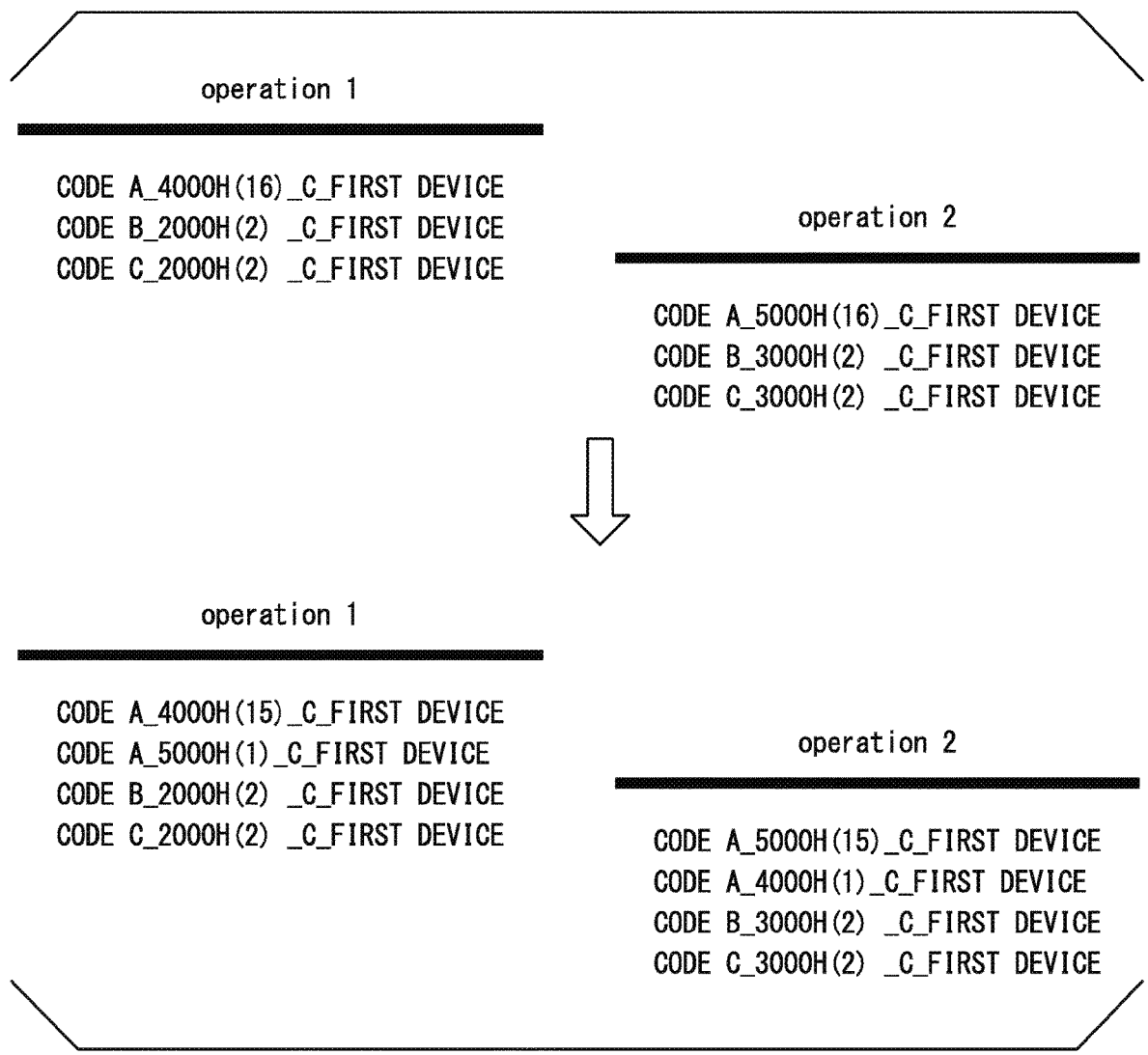
FIG. 16 is a fourth diagram showing the process of correcting the operation plan according to the second embodiment of the present invention.
FIG. 17 is a fifth diagram showing the process of correcting the operation plan according to the second embodiment of the present invention.

Next, an example of a change in the graph indicating the operation period and the configuration information drawn on the part rotation screen 120 before and after correction of parts will be shown. FIG. 16 is a fourth diagram showing the operation plan correction process in the second embodiment according to the present invention. The graph of the operation period and the configuration information of operation 1 and operation 2 before correction of parts are shown in an upper portion of FIG. 16. Before the correction, the operation time of all 16 parts with the code A (part code "AAAA") mounted in operation 1 is 4000 hours. Then, it is assumed that "7FA00008" (operation time: 4000 hours) of operation 1 and "7FA00004" (operation time: 5000 hours) of operation 2 have been replaced with each other as shown in FIG. 13. Then, the operation plan updating unit 122 updates the operation period and the configuration information on the part rotation screen 120. The graph of the operation period and the configuration information of operation 1 and operation 2 are updated as shown in a lower portion of FIG. 16.

The operation plan creation device 10 has a function of correcting parts related to the operation plan through an input of a text file. FIG. 17 is a fifth diagram showing a process of correcting the operation plan according to the second embodiment of the present invention. FIG. 17 shows an example of a text file for part correction. The text file includes items "unit 1", "serial No", "unit 2", "job 2", "unit 3", and "job 3". The name of the device in which a part as a correction target is planned to be mounted in an immediately previous operation period of the operation period as a correction target is described in "unit 1". The serial number of a part to be corrected is described in "serial No". The name of the device in which a target part is planned to be mounted in the operation period as a correction target is described in "unit 2". The operation period name of the operation period as a correction target is described in "job2". The name of the device in which parts are mounted in the operation plan after correction is described in "unit 3". The operation period name in which parts are mounted in the operation plan after correction is described in "job 3". Data shown in a first row of FIG. 17 indicates that the part with serial No "7FA00008" that is a correction target is mounted in the first device in an immediately previous operation period of the operation period operation 1 that is a correction target, setting the correction target is a plan of mounting in the first device in the operation period operation 1, and this plan is changed to a plan of mounting in the same first device in the operation period operation 2. Similarly, data in a second row indicates plane correction in which the part with serial No "7FA00004" planned to be mounted in operation 2 of the first device is corrected to be mounted in operation 1. This means the same correction as in the manipulation shown in FIG. 13. Data in a third row means that a new part with serial No "7FA00104" is mounted in the first device in the operation period operation 2. Data in a fourth row indicates plane correction in which the part with serial No "7FA00002" planned to be mounted in the first device in operation 2 is not mounted in operation 2. When the user inputs text data shown in FIG. 17 to the operation plan creation device 10 and performs a predetermined operation plan change instruction manipulation, the input reception unit 15 receives the text data and the operation plan change instruction manipulation, and the operation plan updating unit 122 corrects the plan of operation 2 of the first device.

Figure 18:
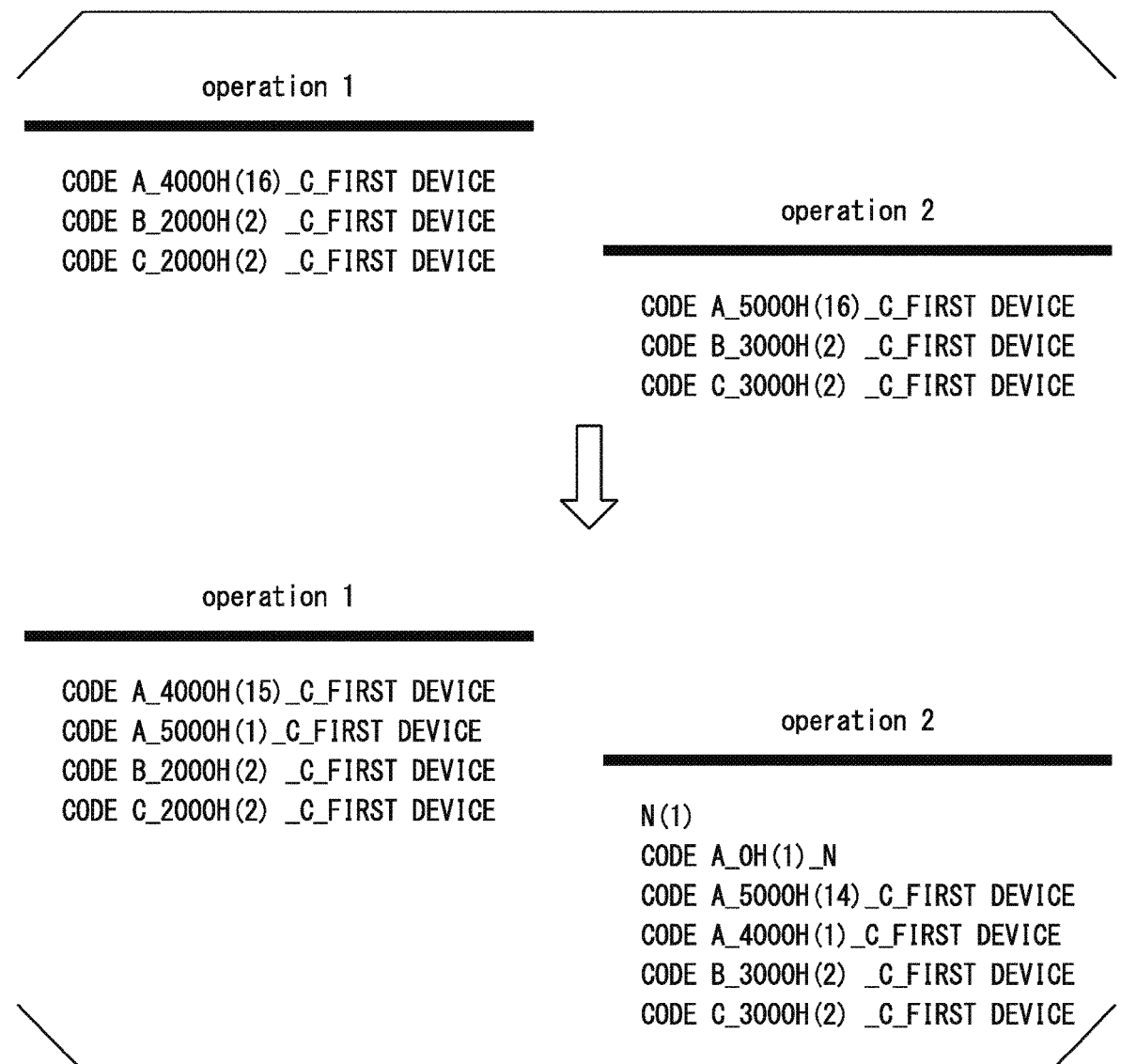
FIG. 18 is a sixth diagram showing the process of correcting the operation plan according to the second embodiment of the present invention.

FIG. 18 shows an example of change in the graph indicating the operation period and the configuration information before and after correction using the text file shown in FIG. 17. FIG. 18 is a sixth diagram showing the process of correcting the operation plan in the second embodiment according to the present invention. An upper portion of FIG. 18 shows the graph of the operation period and configuration information of operation 1 and operation 2 before correction of the parts. A lower portion of FIG. 18 shows the graph of the operation period and configuration information of operation 1 and operation 2 after the correction. A change due to a new part with serial No "7FA00104" as a change point other than the correction shown in FIG. 16 having been replaced with "7FA00002" will be described. In the lower portion of FIG. 18, "N(1)" and "Code A_0H_N" are added to the configuration information, and the number of parts with code A in which the operation time is 5000 hours is 14.

According to the correction function of the second embodiment, it is possible to correct the parts to be included in the operation plan data automatically planned once, not in units of part codes but in units of individual parts. Accordingly, for example, even when a failure or the like has occurred in a part mounted in a device currently in operation and the part is scheduled to be mounted in a future operation plan, it is possible to flexibly correct the plane into a plan for replacement with another part. Accordingly, it is possible to perform management of parts on the basis of an accurate operation plan in which reality has been reflected.

Next, the part, reserve function will be described.

FIG. 19 is a first diagram showing the part reserve process in the second embodiment according to the present invention.

FIG. 19 shows an example of a reserve part setting screen 400. When the input reception unit 15 detects a predetermined manipulation of the user with respect to the display field of the plant name drawn on the part rotation screen 120 (FIG. 7), the operation plan updating unit 122 generates the reserve part setting screen 400 and displays the reserve part setting screen 400 on a display via the output unit 16 (FIG. 19). A list of parts mounted in the device of the plant PL1 and the parts reserved in the plant PL1 is displayed in units of serial No in the reserve part setting screen 400. In the list, items of serial number of the part, part code, design life, operation time, current JOB, reserve flag, and open JOB are displayed. In the list, a part type, a part classification, and the like may be further displayed. In the current JOB, operation X (X is an integer) indicating an operation period of the part is displayed when the part is currently mounted in a certain device of the plant PL1.

When the user performs a click manipulation with respect to the reserve flag field of serial No "7FA0008", the operation plan updating unit 122 generates a detailed setting screen 401, and the output unit 16 displays the screen on the display. A serial No of the selected part, a check field of the reserve flag, and an input field of JOB for opening the reserve are displayed in the detailed setting screen 401. When a check mark is put in the check field of the reserve flag, this means that the part with the serial number is not an assignment target and is reserved at the time of creation and updating of the operation plan. That is, in the case of this example, this means that the part with serial No "7FA0008" is not an assignment target in all the operation plans. The JOB for opening the reserve is a first operation period in which the part is added to the assignment target. That is, the part with serial No "7FA0008" can be assigned from operation 2. When a return time is undecided, "JOB for opening reserve" is set to blank. When the user presses an end button, the detailed setting screen 401 is closed. When the user presses the "Store" button after return to the reserve part setting screen 400, information input on the detailed setting screen 401 is recorded in the storage unit 17 as reserve data.

The operation plan updating unit 122 reads information of "7FA0008" and opening JOB "operation 2" newly registered in the reserve data, removes the part "7FA0008" from the plan when the part "7FA0008" is planned to be mounted in the operation plan prior to "operation 2", checks the mounting possibility or compatibility between parts described in the first embodiment, and corrects the plan for mounting of other assignable parts instead of the part "7FA0008" on the basis of an optimization logic of part selection. The operation plan updating unit 122 records the operation plan data after correction in the storage unit 17. The operation plan data may be updated when a new reserve part is stored or when the user performs a manipulation of an instruction to update predetermined operation plan data.

Figure 20:
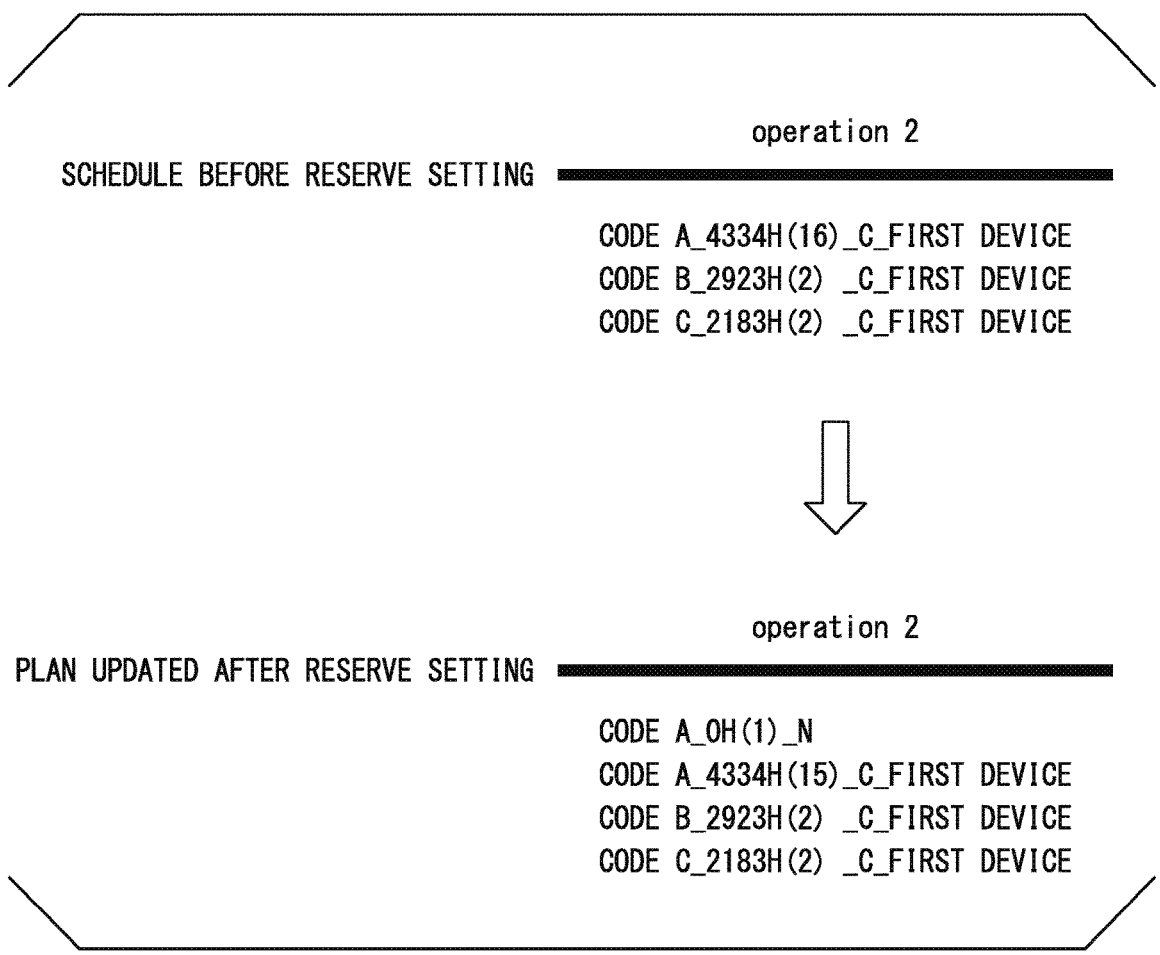
FIG. 20 is a second diagram showing the part reserve process in the second embodiment according to the present invention.

Next, an example of change in the graph indicating the operation period and the configuration information drawn in the part rotation screen 120 before and after a part reserve process has been performed will be shown. FIG. 20 is a second diagram showing the part reserve process in the second embodiment according to the present invention. An upper portion of FIG. 20 shows a graph and configuration information of operation 2 before the part reserve process. Before the reserve process, an operation time of any of 16 parts with the code A is 4000 hours. Then, as shown in FIG. 19, a reserve setting is performed on a part "7FA00008" and stored. Then, the operation plan updating unit 122 updates the operation period and the configuration information on the part rotation screen 120. The graph of the operation period and the configuration information of operation 2 are updated, for example, as in the lower portion of FIG. 20. In this example, one (part "7FA00008") of the parts with the code A in operation 2 is replaced with a new part. This result can be changed by the part correction process described with reference to FIGS. 13 to 18.

According to the reserve function of the second embodiment, for example, it is possible to remove the part from mounting candidates by performing a reserve process on a part that cannot be mounted due to a failure or the like. Accordingly, it is possible to automatically change the parts that are reserve targets included in the operation plan automatically planned once to other parts. Further, it is possible to remove parts that are reserve targets from the assignment targets for an operation plan to be created in the future. Accordingly, even when there are parts that cannot be mounted after start of a plant operation, it is possible to flexibly update the management plan and to perform part management on the basis of an accurate operation plan.

Next, a flow of a process of creating and updating operation plan data in the second embodiment will be described. Description of the same processes as those in FIG. 10 will be omitted.

Figure 21:
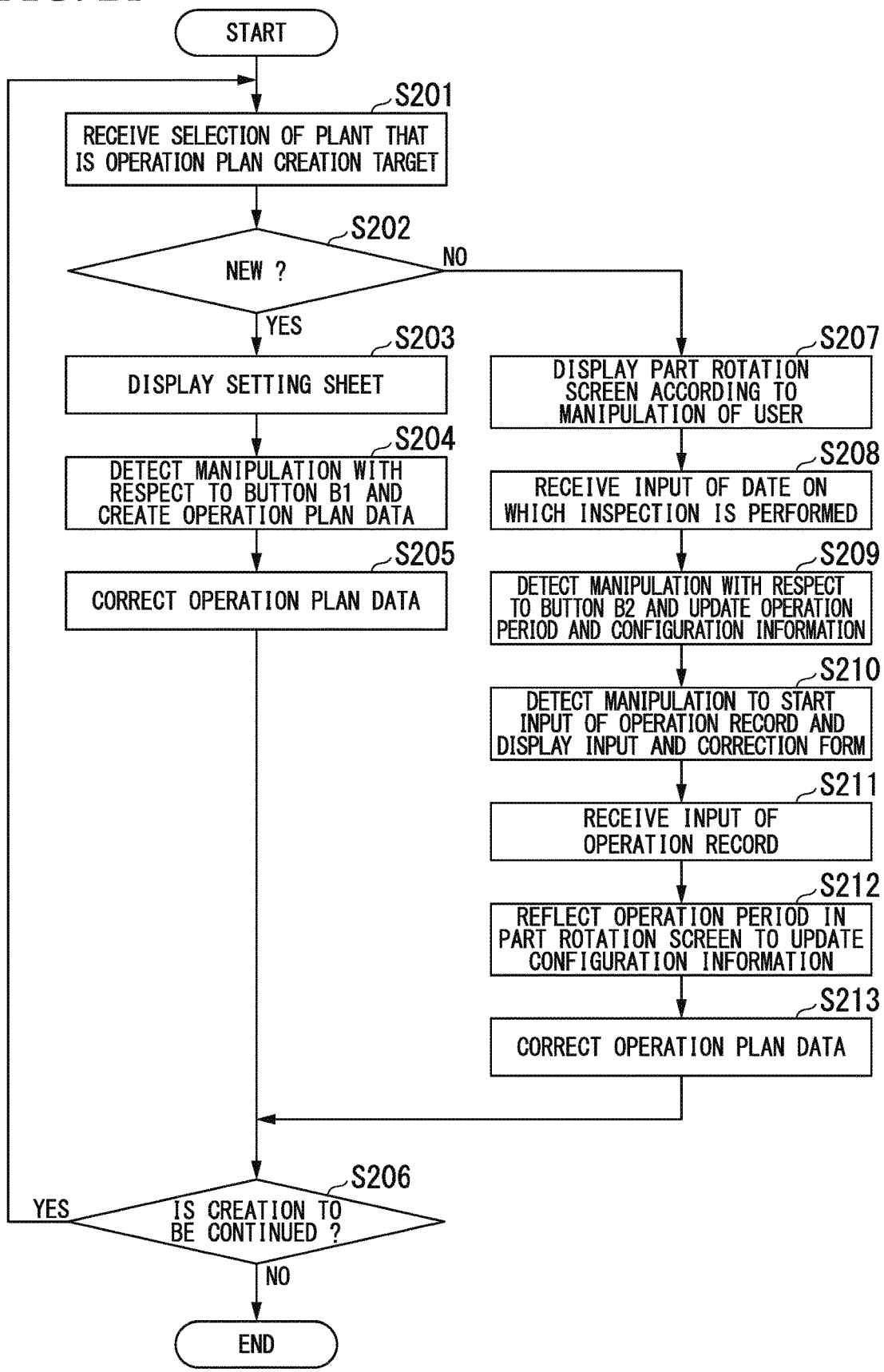
FIG. 21 is a flowchart showing an example of a process of an operation plan creation device in the second embodiment according to the present invention.

FIG. 21 is a flowchart showing an example of a process of the operation plan creation device in the second embodiment according to the present invention.

As a premise, assignment candidate data is recorded in the storage unit 17.

First, the input reception unit 15 receives a selection of a plant that is an operation plan creation target from the user (step S201), Then, the operation plan creation control unit 12 determines whether the operation plan to be created for the selected plant is new (step S202). When the operation plan data is new (Yes in step S202), the output unit 16 displays the operation plan creation start screen 110 (step S203), When the user inputs the setting data shown in FIG. 5, the operation plan creation unit 121 automatically creates operation plan data (step S204). The operation plan creation unit 121 may automatically create a combination of assignable parts in consideration of the compatibility as described in the first embodiment. The operation plan creation unit 121 records the created operation plan data in the storage unit 17.

Then, when the input reception unit 15 detects, for example, a click manipulation with respect to the graph indicating the operation period of the operation plan data, the operation plan updating unit 122 generates the part correction screen 300, and the output unit 16 displays the part correction screen 300. As described with reference to FIG. 13, the user causes the part correction screen 300 to be displayed and corrects the parts included in the operation plan data in units of individual parts. Further, the user describes content of the correction of the part in the text file as shown in FIG. 17, and inputs the content to the operation plan creation device 10. Further, when the input reception unit 15 detects, for example, a click manipulation with respect to the area indicating the plant name of the operation plan data or the like, the operation plan updating unit 122 generates the reserve part setting screen 400, and the output unit 16 displays the reserve part setting screen 400. The user sets and stores the reserve parts as described with reference to FIG. 19. Then, the operation plan updating unit 122 corrects the operation plan data on the basis of a part correction instruction and the setting of reserve parts (step S205). The output unit 16 displays a graph indicating the operation period and the configuration information corrected by the operation plan updating unit 122 (FIGS. 16 and 18).

Then, the operation plan creation control unit 12 determines whether the creation process is to be continued (step S206). When the creation process is not to be continued (No in step S206), the process shown in FIG. 21 ends.

In step S202 above, when the operation plan data to be created for the selected plant is not new (No in step S202), the operation plan updating unit 122 generates the part rotation screen 120 according to a manipulation of the user, and the output unit 16 displays the screen (step S207). Then, the input reception unit 15 receives an input of a performance year and month of regular inspection (step S208), the input reception unit 15 detects a pressing manipulation with respect to the button B2 (step S209). Then, the operation plan updating unit 122 updates the graph indicating the operation period and the configuration information of parts according to date on which regular inspection is performed. The output unit 16 displays the part rotation screen 120 after the updating.

Then, the input reception unit 15 detects a manipulation with respect to an end portion of the graph indicating the operation period of the part as the manipulation to start an input of the operation record. Then, the operation plan updating unit 122 creates the input and correction form screen 200, and displays the input and correction form screen 200 on the display via the output unit 16 (step S210). Subsequently, when the input reception unit 15 receives an input of an operation record (step S211) on the input and correction form screen 200 and pressing of the update button, the operation plan updating unit 122 reflects the operation record input to the input field 202 of the input and correction form screen 200 in the part rotation screen 120 to update the configuration information of the parts or the like (step S212). In this case, the assignability determination unit 13 may check the assignability or the compatibility.

Then, when the input reception unit 15 receives a part correction instruction manipulation using the part correction screen 300, an input of text data for indicating correction of the parts shown in FIG. 7, and a manipulation for setting the reserve parts using the reserve part setting screen 400 as in step S205, the operation plan updating unit 122 corrects the operation plan data on the basis of the part correction instruction and the reserve setting (step S213). The output unit 16 displays the graph indicating the operation period and the configuration information corrected by the operation plan updating unit 122. The operation plan creation control unit 12 proceeds to the determination of step S206.

According to the second embodiment, since it is possible to change the mounting plan of each part included in the operation plan data according to a situation after the operation starts, the operation plan data can be maintained with high accuracy. Accordingly, it is possible to ascertain accurate demand for parts and to achieve efficiency of work.

The operation plan creation device 10 of the operation plan system shown in FIG. 12 may have functions of the second embodiment. For example, the operation plan creation control unit 12 may receive the serial number or the like of the failed part via the communication unit 18 and set the part as a reserve part.

(Hardware Configuration)

Figure 22:
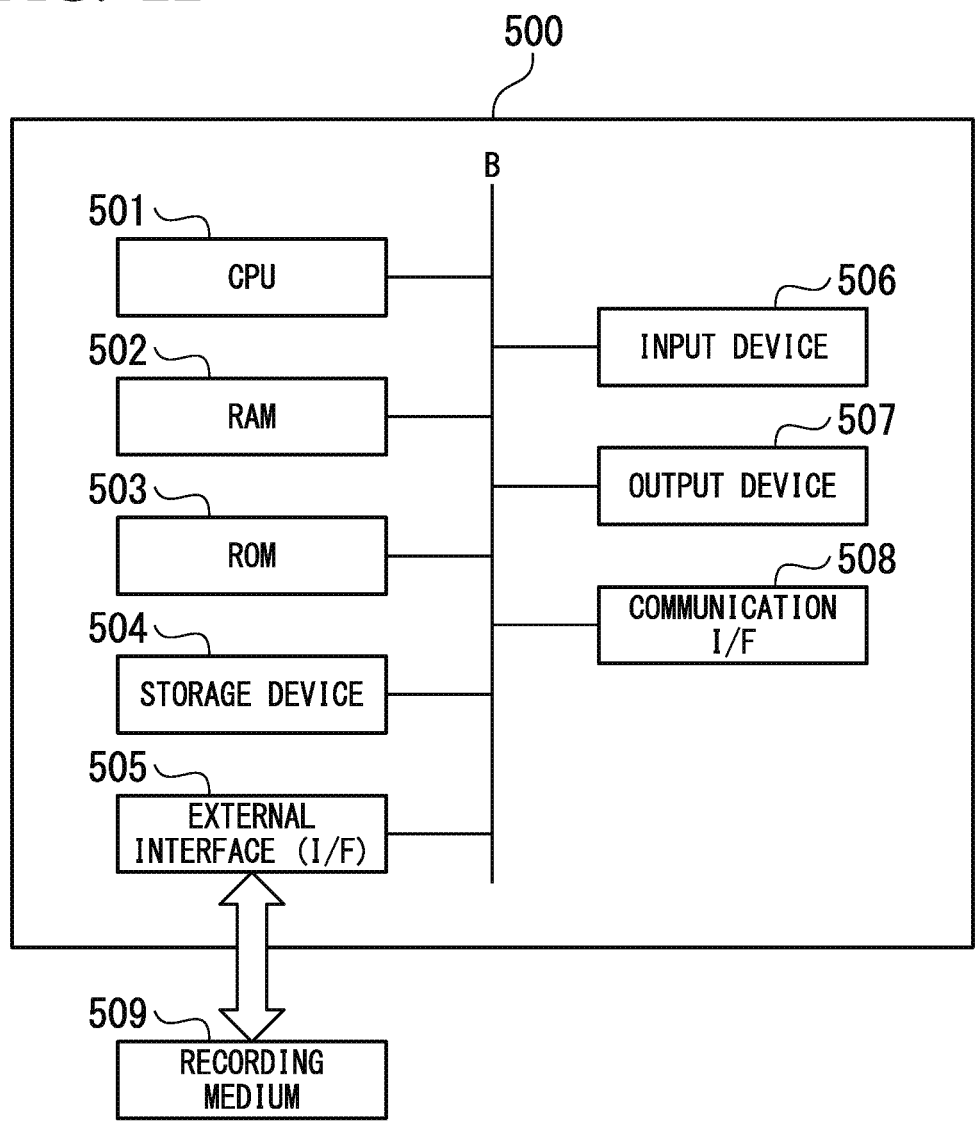
FIG. 22 is a diagram showing an example of a hardware configuration of an operation plan creation device according to the present invention.

The operation plan creation device 10 can be realized, for example, using a general computer 500. An example of the configuration of the computer 500 is shown in FIG. 22. FIG. 22 is a diagram showing an example of a hardware configuration of the operation plan creation device according to the present invention. The computer 500 includes a central processing unit (CPU) 501, a random access memory (RAM) 502, a read only memory (ROM) 503, a storage device 504, an external interface I/O 505, an input device 506, an output device 507, a communication I/F 508, and the like. These devices transmit and receive signals to and from each other via a bus B.

The CPU 501 is an arithmetic device that realizes each function of the computer 500 by reading a program or data stored in the ROM 503, the storage device 504, or the like onto the RAM 502 and executing a process. For example, the respective functional units (the setting data acquisition unit 11, the operation plan creation control unit 12, the operation plan creation unit 121, the operation plan updating unit 122, the assignability determination unit 13, the master registration unit 14, the input reception unit 15, and the output unit 16) described above are functions provided to the computer 500 by the CPU 501 reading and executing the program stored in the ROM 503 or the like. The RAM 502 is a volatile memory that is used as a work area of the CPU 501 or the like. The ROM 503 is a non-volatile memory that holds the program or data even when power is turned off. The storage device 504 is realized by, for example, a hard disk drive (HDD) or a solid state drive (SSD), and stores an operation system (OS), an application program, various of pieces of data, and the like. An external I/F 505 is an interface with an external device. The external device is, for example, a recording medium 509. The computer 500 can perform reading and writing on the recording medium 509 via the external I/F 505. The recording medium 509 includes, for example, an optical disc, a magnetic disk, a memory card, or a universal serial bus (USB) memory.

The input device 506 includes, for example, a mouse and a keyboard, receives an instruction from a manipulating person and inputs various manipulations or the like to the computer 500. The output device 507 is realized by, for example, a liquid crystal display, and displays a processing result of the CPU 501. The communication I/F 508 is an interface that connects the computer 500 to a network such as the Internet through wired communication or wireless communication. The bus B is connected to each constituent device, and transmits and receives various control signals and the like between control devices.

Each process in the operation plan creation device 10 or the like described above is stored in a computer-readable recording medium in the form of a program, and a computer of the operation plan creation device 10 reads and executes this program, such that the process is performed. Here, the computer-readable recording medium refers to a magnetic disk, a magneto-optical disc, a CD-ROM, a DVD-ROM, a semiconductor memory, or the like. This computer program may be distributed to a computer through a communication line, and the computer that has received this distribution may execute the program.

The program may be a program for realizing some of the above-described functions. Further, the program may be a so-called difference file (difference program) that can realize the above-described functions in combination with a program already recorded in a computer system. The operation plan creation device 10 may be configured of one computer or may be configured of a plurality of communicatively connected computers.

Further, it is possible to appropriately replace the components in the above-described embodiments with known components without departing from the spirit of the present invention. The technical scope of the present invention is not limited to the above embodiments, and various changes can be made without departing from the spirit of the present invention. The devices 20 to 40 are a first device, and the device 50 is an example of a second device.

INDUSTRIAL APPLICABILITY

With the operation plan creation device, the operation plan creation system, the operation plan creation method, and the program described above, it is possible to automatically create a management plan in consideration of compatibility of parts. Further, it is possible to replace parts planned to be mounted in the created management plan.

REFERENCE SIGNS LIST

10 Operation plan creation device
11 Setting data acquisition unit
12 Operation plan creation control unit
121 Operation plan creation unit
122 Operation plan updating unit
13 Assignability determination unit
14 Master registration unit
15 Input reception unit
16 Output unit
17 Storage unit
18 Communication unit
20, 30, 40, 50 device
60 Operation plan creation System
100 Compatibility master registration screen
110 Operation plan creation start screen
120 Part rotation screen
200 Input and correction form screen
300 Part correction screen
310 Assignable part display screen
320 New part addition screen
400 Reserve part setting screen
401 Detailed setting screen

What is claimed is:

1. An operation plan creation device comprising:
a non-transitory computer readable medium configured to store instructions; and
a processor connected to the non-transitory computer readable medium, wherein the processor is configured to execute the instructions for:
acquiring setting data including information on a time of start of an operation of a part of a plurality of parts and a time of a scheduled performance of inspection of the part, and information on parts of the plurality of parts that are candidates for assignment to a device;
creating data of an operation plan including an operation period of the part from the time of the start of the operation to the time of the scheduled performance of inspection using the setting data; and
determining an assignability for the part, wherein the assignability of the part is based on whether or not any of the plurality of parts are assignable on the basis of part codes associated with each of the plurality of parts and, mountable part group information defining a group of the part codes which are able to be simultaneously mounted and candidates of the part codes which are associated with other parts of the plurality of parts replaceable for each of the plurality of parts among the group in response to a determination that parts of the plurality of parts having different identifying codes are a same type and associated with a same parts code, and
creating the data of the operation plan in response to a determination that the plurality of parts determined to be assignable have been used.

2. The operation plan creation device according to claim 1, wherein the processor is further configured to execute the instructions for:
updating the data of the operation plan on the basis of information on an operation record of the part,
wherein the operation plan is updated based on the data of the operation plan with data of an operation plan in response to a first part being replaced with a second part determined to be assignable among the parts of the plurality of parts that are assignment candidates on the basis of the mountable part group information.

3. The operation plan creation device according to claim 2, wherein the processor is further configured to determine whether or not there is compatibility between the first part before replacement and the second part after replacement on the basis of the mountable part group information and the part codes associated with the first part and the second part.

4. The operation plan creation device according to claim 2, wherein the processor is further configured to execute the instructions for:
receiving a change of a third part of the plurality of parts planned to be mounted included in the data of the operation plan to a fourth part of the plurality of parts based on information of the identifying code of the third part and the identifying code of the fourth part,
determining whether or not the fourth part is assignable on the basis of the parts code of the third part, the parts code of the fourth part, and the mountable part group information, and
creating the data of the operation plan after a change in which the part indicated by the identifying code of the third part has been changed to the part indicated by the identifying code of the fourth part in response to a determination that the fourth part is assignable.

5. The operation plan creation device according to claim 4, wherein the processor is further configured to execute the instructions for:
receiving designation of the identifying code of a fifth part of the plurality of parts to be excluded from candidates of assignment to the device among the plurality of parts,
creating the data of the operation plan with the plurality of parts other than the parts of the plurality of parts indicated by the identifying code of the fifth part being assignment targets, and
updating the data of the operation plan with the parts of the plurality of parts other than the parts of the plurality of parts indicated by the identifying code of the fifth part being assignment targets.

6. The operation plan creation device according to claim 1, wherein the processor is further configured to determine whether or not the parts of the plurality of parts that are assignment candidates are able to be mounted and simultaneously used with the other parts in the device on the basis of the mountable part group information and the part codes associated with the parts of the plurality of parts that are assignment candidates.

7. The operation plan production device according to claim 1, wherein the processor is further configured to generate the mountable part group information on the basis of a part master defining a group of the part codes of the parts of the plurality of parts that are able to be used simultaneously and a compatibility master defining compatibility among the parts of the plurality of parts indicated by a different types of the part codes.

8. The operation plan creation device according to claim 1, wherein the processor is further configured to execute the instructions for:
registering information defining compatibility among the parts of the plurality of parts.

9. An operation plan creation system comprising:
the operation plan creation device according to claim 1;
a first device configured to acquire information on an operation record of the device from the device and transmit the information to the operation plan creation device; and
a second device configured to acquire information defining compatibility of the plurality of parts and transmit the information to the operation plan creation device.

10. An operation plan creation device comprising:
a non-transitory computer readable medium configured to store instructions; and
a processor connected to the non-transitory computer readable medium, wherein the processor is configured to execute the instructions for:
acquiring setting data including information on a time of start of an operation of a part of the plurality of parts and a time of a scheduled performance of inspection of the part, and information on parts of the plurality of parts that are candidates for assignment to a device;
creating data of an operation plan including an operation period of the part from the time of the start of the operation to the time of the scheduled performance of inspection using the setting data; and
updating the data of the operation plan; and
receiving a change of a seventh part of the plurality of parts planned to be mounted included in the data of the operation plan to a eighth part of the plurality of parts with which a parts code replaceable with a parts code of the seventh part is associated in response to a determination that the seventh part and the eighth part having different identifying codes are a same type and associated with a same parts code,
receiving information of the identifying code of the seventh part and the identifying code of the eighth part,
creating the data of the operation plan after the change in which the part indicated by the identifying code of the seventh part has been changed to the part indicated by the identifying code of the eighth part in response to the received change of the seventh part to the eighth part.

11. An operation plan creation method comprising:
acquiring, by an operation plan creation device, setting data including information on a time of start of an operation of a part of a plurality of parts and a time of a scheduled performance of inspection of the part, and information on parts of the plurality of parts that are candidates for assignment to a device;
creating, by the operation plan creation device, data of the operation plan including an operation period of the part from the time of the start of the operation to the time of the scheduled performance of inspection using the setting data; and
determining, by the operation plan creation device, an assignability for the part,
wherein determining the assignability for the part includes determining whether or not any of the plurality of parts are assignable on the basis of part codes associated with the plurality of parts and, mountable part group information defining a group of the part codes associated with the parts of the plurality of parts which are able to be simultaneously mounted and candidates of the part codes which are associated with other parts of the plurality of parts replaceable for each of the plurality of parts among the group in response to a determination that the parts of the plurality of parts having different identifying codes are a same type and associated with a same parts code, and
wherein creating the data of the operation plan includes creating the data of the operation plan in response to a determination that the plurality of parts determined to be assignable have been used.

12. A non-transitory computer readable medium containing computer instructions stored therein for causing a processor to perform steps of:
acquiring setting data including information on a time of start of an operation of a part of a plurality of parts and a time of a scheduled performance of inspection of the part, and information on parts of the plurality of parts that are candidates for assignment to a device;
creating data of the operation plan including an operation period of the part from the time of the start of the operation to the time of the scheduled performance of inspection using the setting data; and
determining an assignability for the part,
wherein determining the assignability for the part includes determining whether or not any of the plurality of parts are assignable on the basis of part codes associated with the plurality of parts and, mountable part group information defining a group of the part codes associated with the parts of the plurality of parts which are able to be simultaneously mounted and candidates of the part codes which are associated with other parts of the plurality of parts replaceable for each of the plurality of parts among the group in response to a determination that the parts of the plurality of parts having different identifying codes are a same type and associated with a same parts code, and
wherein the creating the data of the operation plan includes creating the data of the operation plan in response to a determination that the plurality of parts determined to be assignable have been used.

* * * * *